(12) United States Patent
Ohashi

(10) Patent No.: US 12,429,357 B2
(45) Date of Patent: Sep. 30, 2025

(54) MAPPING APPARATUS, TRACKER, MAPPING METHOD, AND PROGRAM

(71) Applicant: SONY INTERACTIVE ENTERTAINMENT INC., Tokyo (JP)

(72) Inventor: Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 385 days.

(21) Appl. No.: 18/012,457

(22) PCT Filed: Aug. 11, 2020

(86) PCT No.: PCT/JP2020/030595
§ 371 (c)(1),
(2) Date: Dec. 22, 2022

(87) PCT Pub. No.: WO2022/034638
PCT Pub. Date: Feb. 17, 2022

(65) Prior Publication Data
US 2023/0314171 A1    Oct. 5, 2023

(51) Int. Cl.
*G01C 21/00* (2006.01)
*G06T 15/20* (2011.01)
(52) U.S. Cl.
CPC ......... *G01C 21/3863* (2020.08); *G06T 15/20* (2013.01); *G06T 2200/24* (2013.01)
(58) Field of Classification Search
None
See application file for complete search history.

(56) References Cited

U.S. PATENT DOCUMENTS

| | | | |
|---|---|---|---|
| 10,636,207 B1* | 4/2020 | Swidersky | G01C 21/383 |
| 2022/0237816 A1* | 7/2022 | Jiang | G06T 7/70 |

FOREIGN PATENT DOCUMENTS

| | | |
|---|---|---|
| JP | 2020503507 A | 1/2020 |
| WO | 2019167213 A1 | 9/2019 |

OTHER PUBLICATIONS

International Search Report and Written Opinion dated Oct. 13, 2020, from PCT/JP2020/030595, 8 sheets.

* cited by examiner

*Primary Examiner* — Nurun Flora
(74) *Attorney, Agent, or Firm* — Kilpatrick Townsend & Stockton LLP

(57) ABSTRACT

Provided are a mapping apparatus, a tracker, a mapping method, and a program that can accurately map a given geographic position on an environmental map. An environmental map data storing unit (80) stores environmental map data indicating an environmental map in which a position expressed by a Euclidean coordinate system is associated with a position expressed by a geographic coordinate system. A SLAM processing executing unit (84) estimates, on the basis of sensing data acquired by a tracker and the environmental map data, a position of the tracker (12) expressed by the Euclidean coordinate system. A target position data acquiring unit (88) acquires target position data indicating a target position expressed by the geographic coordinate system. A coordinate converting unit (90) identifies the target position expressed by the Euclidean coordinate system based on the target position data and the environmental map data.

15 Claims, 18 Drawing Sheets

F I G . 3
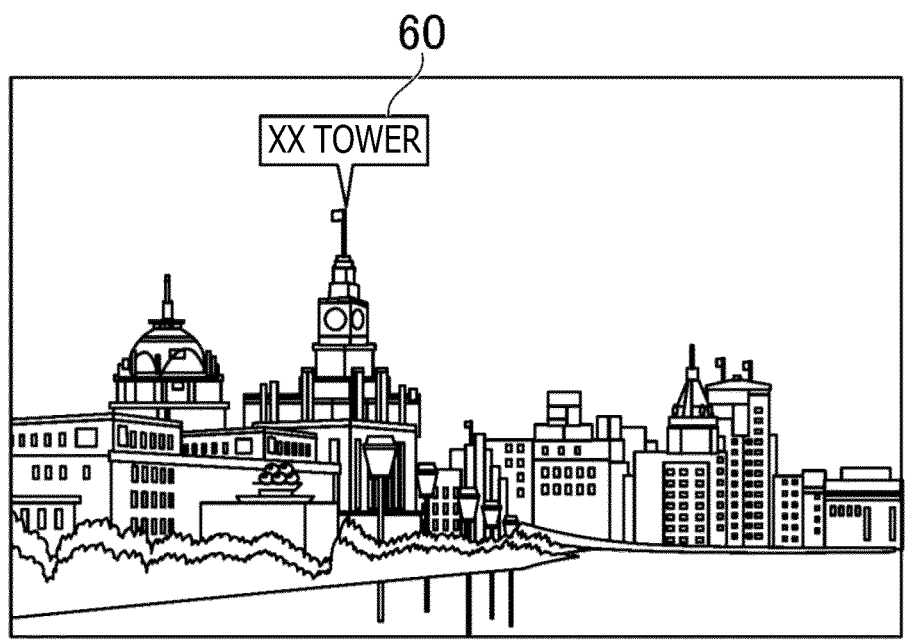

MAPPING APPARATUS, TRACKER, MAPPING METHOD, AND PROGRAM

TECHNICAL FIELD

The present invention relates to a mapping apparatus, a tracker, a mapping method, and a program.

BACKGROUND ART

There has been known SLAM (Simultaneous Localization and Mapping) technology for performing self-localization and environmental map building on the basis of sensing data acquired by trackers such as images taken by cameras included in the trackers. As an exemplary technology utilizing SLAM, PTL 1 describes an environmental map which is generated on the basis of sensing data acquired by each of a plurality of trackers and in which positions are expressed by a shared coordinate system shared by the plurality of trackers.

Further, there are various map services for providing maps (including not only general maps but also satellite maps and aeronautical charts) to users via the Internet.

Further, there is X Reality (XR) technology, such as AR (Augmented Reality) technology, for displaying virtual visual information superimposed on real-world scenery.

CITATION LIST

Patent Literature

[PTL 1]
PCT Patent Publication No. WO2019/167213

SUMMARY

Technical Problem

Linking a user's position estimated by using SLAM technology with a geographic position indicated on a map or the like makes it possible to develop novel services using XR technology.

For example, a service that allows a user to see visual information representative of an anchor, local information, store information, or the like placed on a map indicated by map data provided by a map service at a real-world position corresponding to the geographic position on the map can be achieved.

Further, for example, a service that allows, in response to a user operation for designating a geographic position on a map displayed on a terminal such as a smartphone or a tablet terminal, the user to see visual information, such as a mark, at a real-world position corresponding to the designated geographic position can be achieved.

However, while a geographic position such as a position indicated on a map is expressed by a geographic coordinate system with latitude, longitude, altitude, or the like, a user's position in an environmental map estimated by using SLAM technology is expressed by a Euclidean coordinate system with an X coordinate value, a Y coordinate value, a Z coordinate value, or the like.

Since a geographic position and a user's position in an environmental map estimated by using SLAM technology are expressed by different coordinate systems in such a way, in the related art, a given geographic position has not been able to be accurately mapped on an environmental map.

The present invention has been made in view of the problem described above and has an object to provide a mapping apparatus, a tracker, a mapping method, and a program that can accurately map a given geographic position on an environmental map.

Solution to Problem

In order to solve the problem described above, a mapping apparatus according to the present invention includes an environmental map data storing unit configured to store environmental map data indicating an environmental map in which a position expressed by a Euclidean coordinate system is associated with a position expressed by a geographic coordinate system, a tracker position estimating unit configured to estimate, on the basis of sensing data acquired by a tracker and the environmental map data, a position of the tracker expressed by the Euclidean coordinate system, a target position data acquiring unit configured to acquire target position data indicating a target position expressed by the geographic coordinate system, and a coordinate converting unit configured to identify, on the basis of the target position data and the environmental map data, the target position expressed by the Euclidean coordinate system.

In one aspect of the present invention, a display control unit configured to perform control so that a display unit included in the tracker displays an image representative of a view in which visual information placed at the target position expressed by the Euclidean coordinate system is seen from the position of the tracker expressed by the Euclidean coordinate system is further included.

In this aspect, the target position data acquiring unit may acquire the target position data associated with registered data registered on a given map service in association with the target position, and the display control unit may perform control so that the display unit displays an image representative of a view in which the visual information on the basis of the registered data is seen from the position of the tracker expressed by the Euclidean coordinate system.

Alternatively, the target position data acquiring unit may acquire the target position data associated with name data indicating a name corresponding to the target position, and the display control unit may perform control so that the display unit displays an image representative of a view in which the visual information representing the name indicated by the name data is seen from the position of the tracker expressed by the Euclidean coordinate system.

Further, the display control unit may perform control so that the display unit included in each of a plurality of the trackers in a given range in real space displays the image corresponding to a corresponding one of the trackers.

Further, the display control unit may transmit, to the tracker including the display unit that is to display the image, tracker position data indicating the position of the tracker expressed by the Euclidean coordinate system and conversion target position data indicating the target position expressed by the Euclidean coordinate system.

Further, in one aspect of the present invention, the target position data acquiring unit acquires, in response to a user operation for designating the target position on a map displayed on a terminal different from the tracker, the target position data indicating the target position designated.

Further, in one aspect of the present invention, the tracker position estimating unit estimates, on the basis of the sensing data and the environmental map data, the position of the tracker expressed by the Euclidean coordinate system and the position of the tracker expressed by the geographic coordinate system, and the coordinate converting unit identifies the target position expressed by the Euclidean coordinate system on the basis of the target position data, the position of the tracker expressed by the Euclidean coordinate system, and the position of the tracker expressed by the geographic coordinate system.

Further, in one aspect of the present invention, the mapping apparatus includes a plurality of the environmental map data storing units, the plurality of the environmental map data storing units store respective pieces of the environmental map data indicating the environmental maps different from each other in position expressed by the geographic coordinate system and associated with an origin of the Euclidean coordinate system, the tracker position estimating unit estimates the position of the tracker expressed by the Euclidean coordinate system in the environmental map data on the basis of the environmental map data and the sensing data acquired by the tracker, the environmental map data being identified from the plurality of pieces of the environmental map data stored in the respective plurality of the environmental map data storing units on the basis of the sensing data, and the coordinate converting unit identifies the target position expressed by the Euclidean coordinate system in the environmental map data on the basis of the environmental map data and the target position data, the environmental map data being identified from the plurality of pieces of the environmental map data stored in the respective plurality of the environmental map data storing units on the basis of the target position data.

Further, in one aspect of the present invention, a correspondence estimating unit configured to estimate, on the basis of a set of feature points included in the environmental map and a map indicated by given map data provided by a given map service, a position and an orientation expressed by the geographic coordinate system and corresponding to the set of feature points, and an environmental map data updating unit configured to associate the position and the orientation that have been estimated with the set of feature points are further included.

In this aspect, the correspondence estimating unit may estimate the orientation expressed by the geographic coordinate system and corresponding to the set of feature points based on a first projection image that is an image having a first resolution and being representative of a view in which the set of feature points is projected on a plane orthogonal to a gravity axis and a first reference image that is an image having the first resolution and generated based on the map, and the correspondence estimating unit may estimate the position expressed by the geographic coordinate system and corresponding to the set of feature points based on a second projection image that is an image having a second resolution higher than the first resolution and being representative of a view in which the set of feature points is projected on the plane, a second reference image that is an image having the second resolution and generated based on the map, and the orientation estimated.

Further, a tracker according to the present invention includes a sensor unit, a display unit, and a display control unit configured to control, on the basis of a position of the tracker expressed by a Euclidean coordinate system and estimated on the basis of sensing data acquired by the sensor unit and a target position that is a geographic position designated by a user on a map displayed on a terminal different from the tracker, the display unit to display an image representative of a view in which visual information placed at the target position expressed by the Euclidean coordinate system is seen from the position of the tracker expressed by the Euclidean coordinate system.

Further, a mapping method according to the present invention includes a step of estimating, on the basis of sensing data acquired by a tracker and environmental map data indicating an environmental map in which a position expressed by a Euclidean coordinate system is associated with a position expressed by a geographic coordinate system, a position of the tracker expressed by the Euclidean coordinate system, a step of acquiring target position data indicating a target position expressed by the geographic coordinate system, and a step of identifying the target position expressed by the Euclidean coordinate system on the basis of the target position data and the environmental map data.

Further, a program according to the present invention causes a computer to execute a procedure of estimating, based on sensing data acquired by a tracker and environmental map data indicating an environmental map in which a position expressed by a Euclidean coordinate system is associated with a position expressed by a geographic coordinate system, a position of the tracker expressed by the Euclidean coordinate system, a procedure of acquiring target position data indicating a target position expressed by the geographic coordinate system, and a procedure of identifying the target position expressed by the Euclidean coordinate system based on the target position data and the environmental map data.

BRIEF DESCRIPTION OF DRAWINGS

FIG. 3 is a diagram illustrating an example of how a name image is seen.

DESCRIPTION OF EMBODIMENT

In the below, an embodiment of the present invention is described in detail with reference to the drawings.

Figure 1:
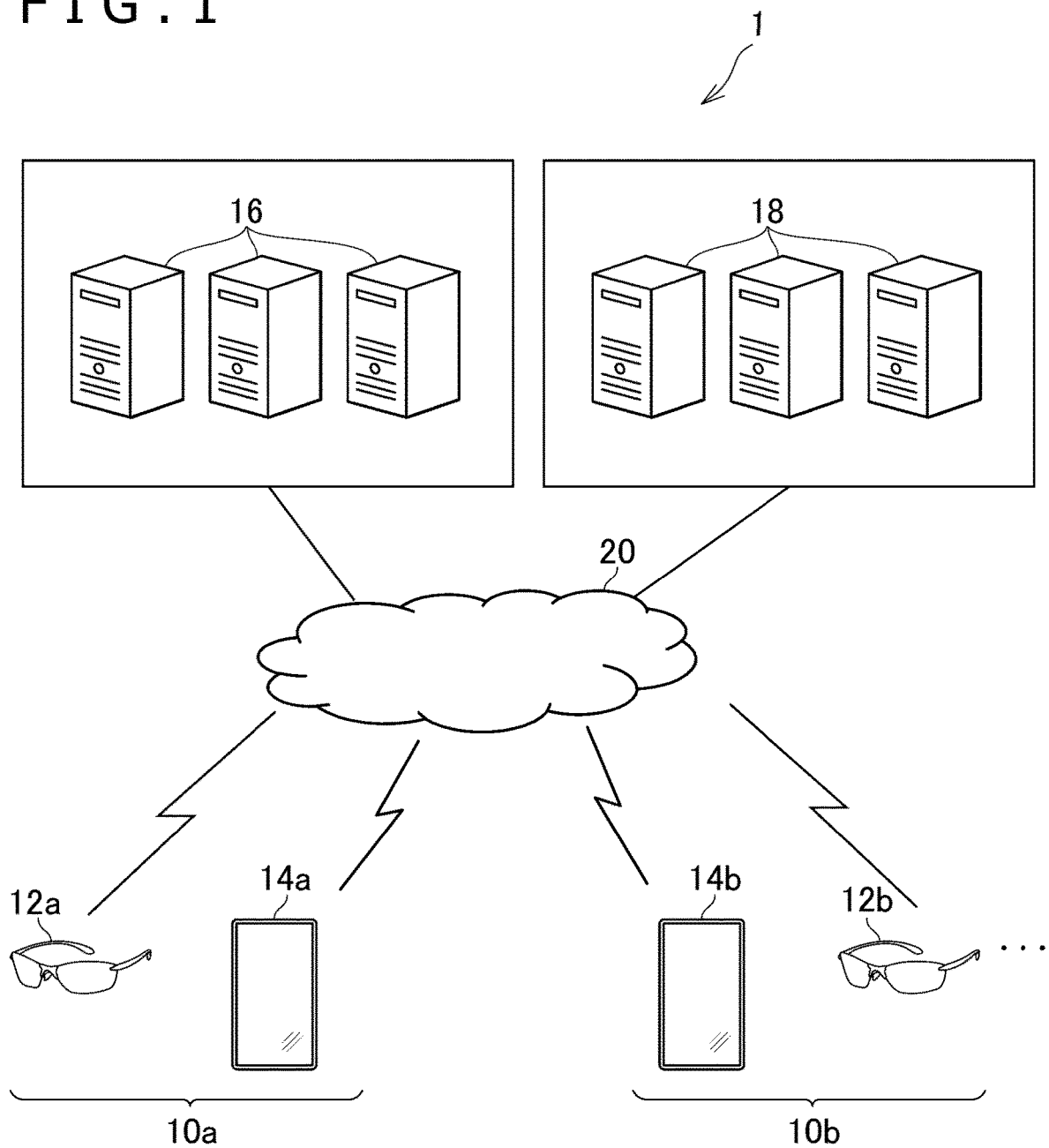
FIG. 1 is a configuration diagram illustrating an example of an environmental map management system according to an embodiment of the present invention.

FIG. 1 is a configuration diagram illustrating an example of an environmental map management system 1 according to the embodiment of the present invention. As illustrated in FIG. 1, the environmental map management system 1 according to the present embodiment includes a plurality of user systems 10. Further, the user system 10 according to the present embodiment includes a tracker 12 and a terminal 14. In FIG. 1, two user systems 10a and 10b are exemplified. The user system 10a includes a tracker 12a and a terminal 14a. The user system 10b includes a tracker 12b and a terminal 14b. Further, the environmental map management system 1 according to the present embodiment also includes a server 16 and a map service 18.

In the present embodiment, for example, a plurality of users who use the environmental map management system 1 each manage the user's own user system 10. Further, each user cannot access the user systems 10 managed by the other users.

The tracker 12, the terminal 14, the server 16, and the map service 18 are connected to a computer network 20 such as the Internet. Further, in the present embodiment, the tracker 12, the terminal 14, the server 16, and the map service 18 are communicable with each other.

The tracker 12 according to the present embodiment is an apparatus configured to track a position and an orientation of the user wearing the tracker 12 in question.

Figure 2A:
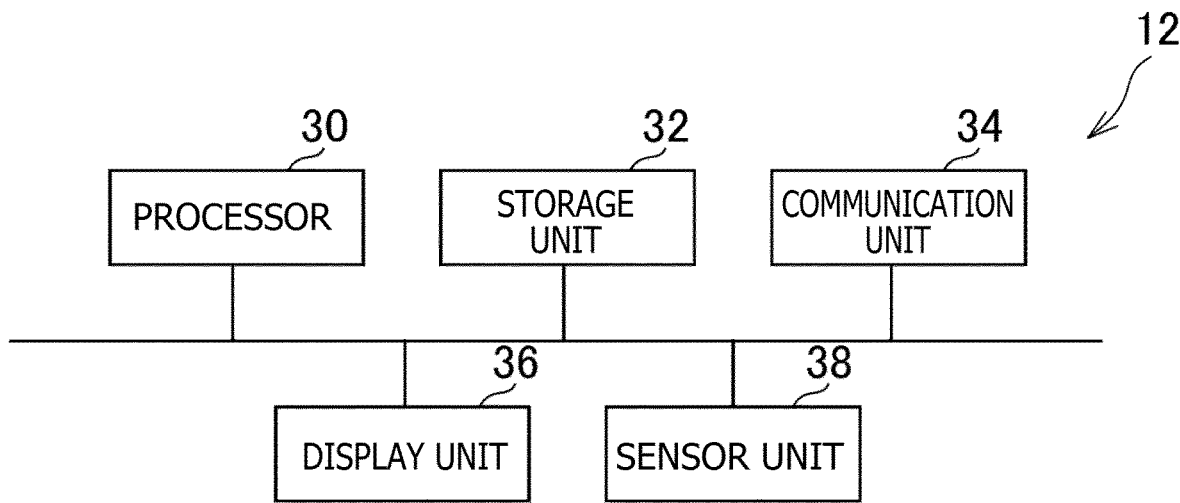
FIG. 2A is a configuration diagram illustrating an example of a tracker according to the embodiment of the present invention.

As illustrated in FIG. 2A, the tracker 12 according to the present embodiment includes a processor 30, a storage unit 32, a communication unit 34, a display unit 36, and a sensor unit 38.

The processor 30 is a program control device, such as a microprocessor, configured to operate according to a program installed on the tracker 12, for example. The storage unit 32 is a storage element such as a ROM (Read Only Memory) or a RAM (Random Access Memory). The storage unit 32 stores, for example, a program that is executed by the processor 30. The communication unit 34 is a communication interface such as a wireless LAN (Local Area Network) module.

The display unit 36 is a display, such as a liquid crystal display or an organic EL (Electronic Luminescent) display, disposed on a front side of the tracker 12. The display unit 36 according to the present embodiment displays a left-eye image and a right-eye image, thereby being capable of displaying a three-dimensional image, for example. Note that, the display unit 36 does not necessarily support three-dimensional image display and may only support two-dimensional image display.

The sensor unit 38 includes sensors such as a camera, an inertial sensor (IMU), a geomagnetic sensor (azimuth sensor), a gyrocompass, a GPS (Global Positioning System) module, a depth sensor, and an altitude sensor.

The camera included in the sensor unit 38 takes an image at a predetermined sampling rate, for example. The camera included in the sensor unit 38 may be capable of taking a three-dimensional image or a depth image.

Further, the geomagnetic sensor or the gyrocompass included in the sensor unit 38 outputs data indicating the direction in which the tracker 12 faces to the processor 30 at a predetermined sampling rate.

Further, the inertial sensor included in the sensor unit 38 outputs data indicating the acceleration, rotation amount, movement amount, or the like of the tracker 12 to the processor 30 at a predetermined sampling rate.

Further, the GPS module included in the sensor unit 38 outputs data indicating the latitude and the longitude of the tracker 12 to the processor 30 at a predetermined sampling rate.

The depth sensor included in the sensor unit 38 is a depth sensor by using ToF (Time of Flight), Patterned stereo, or Structured Light technology, for example. The depth sensor in question outputs data indicating the distance from the tracker 12 to the processor 30 at a predetermined sampling rate.

Further, the altitude sensor included in the sensor unit 38 outputs data indicating the altitude of the tracker 12 to the processor 30 at a predetermined sampling rate.

Further, the sensor unit 38 may include another sensor such as an RF sensor, an ultrasonic sensor, or an event-driven sensor.

Note that, the tracker 12 according to the present embodiment may include, for example, an input/output port such as an HDMI (registered trademark) (High-Definition Multimedia Interface) port, a USB (Universal Serial Bus) port, or an AUX (Auxiliary) port, a pair of headphones, or a speaker.

The terminal 14 according to the present embodiment is a portable information terminal such as a smartphone or a tablet device.

Figure 2B:
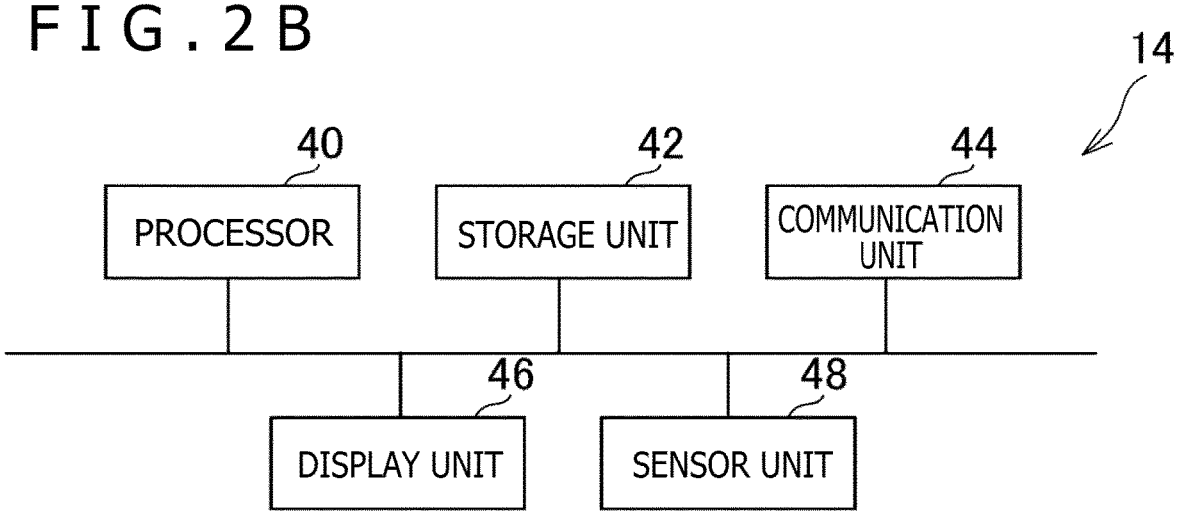
FIG. 2B is a configuration diagram illustrating an example of a terminal according to the embodiment of the present invention.

As illustrated in FIG. 2B, the terminal 14 according to the present embodiment includes a processor 40, a storage unit 42, a communication unit 44, a display unit 46, and a sensor unit 48.

The processor 40 is a program control device, such as a microprocessor, configured to operate according to a program installed on the terminal 14, for example. The storage unit 42 is a storage element such as a ROM or a RAM. The storage unit 42 stores, for example, a program that is executed by the processor 40. The communication unit 44 is a communication interface such as a wireless LAN module. The display unit 46 is a display such as a liquid crystal display or an organic EL display. The sensor unit 48 includes sensors such as a camera, an inertial sensor (IMU), a geomagnetic sensor (azimuth sensor), a gyrocompass, a GPS module, a depth sensor, and an altitude sensor.

The server 16 according to the present embodiment is a server computer, such as a cloud server, that is used by the users who use the environmental map management system 1, for example. All the user systems 10 included in the environmental map management system 1 are allowed to access the server 16 according to the present embodiment.

Figure 2C:
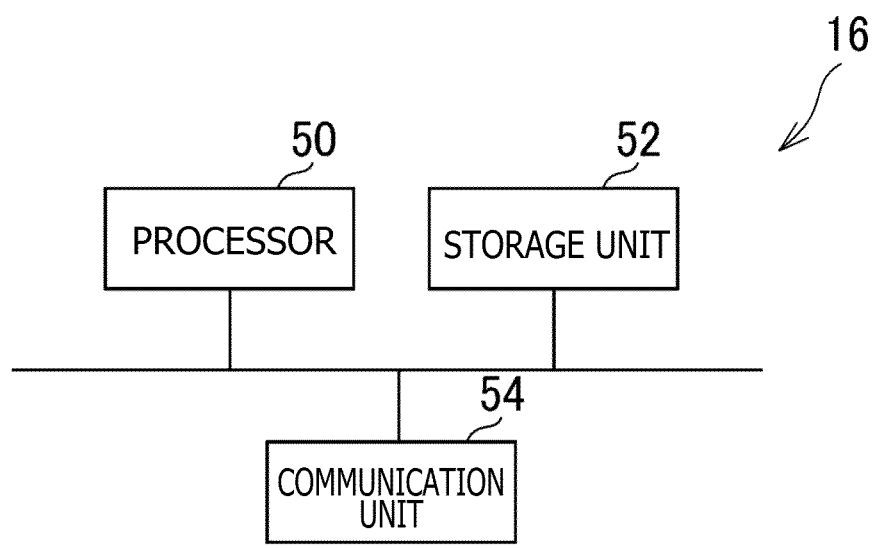
FIG. 2C is a configuration diagram illustrating an example of a server according to the embodiment of the present invention.

As illustrated in FIG. 2C, the server 16 according to the present embodiment includes a processor 50, a storage unit 52, and a communication unit 54. The processor 50 is a program control device, such as a CPU (Central Processing Unit), configured to operate according to a program installed on the server 16, for example. The storage unit 52 is a storage element such as a ROM or a RAM or a solid-state drive, for example. The storage unit 52 stores, for example, a program that is executed by the processor 50. The communication unit 54 is a communication interface such as a network board or a wireless LAN module.

The map service 18 according to the present embodiment includes a server computer, such as a cloud server, managed by an existing map service provider, for example, and provides given map data to the users. Map data to be provided by the map service 18 is not limited to map data indicating a general map. The map service 18 may provide map data indicating an aeronautical chart (aerial image) or a satellite map (satellite image). A map indicated by map data to be provided by the map service 18 according to the present embodiment is a three-dimensional map in which latitude, longitude, altitude, and directions are expressed, for example. Note that, a map indicated by map data to be provided by the map service 18 may be a two-dimensional map in which latitude, longitude, and directions are expressed, for example.

In the present embodiment, sensing data acquired by the tracker 12 included in the user system 10 is transmitted to the server 16. In the present embodiment, for example, sensing data acquired by the processor 30 on the basis of sensing by the sensor unit 38 is transmitted to the server 16.

Then, in the present embodiment, for example, the server 16 executes, on the basis of the sensing data, SLAM (Simultaneous Localization and Mapping) processing including self-localization processing and environmental map building processing.

As a result, environmental map data indicating environmental maps is accumulated in the server 16. Further, in the present embodiment, tracker position data indicating the result of the estimation of the position and the orientation of the user (here, for example, the result of the estimation of the position and the orientation of the tracker 12) by SLAM processing is transmitted from the server 16 to the tracker 12.

Linking a user's position estimated in such a way with a geographic position indicated on a map or the like makes it possible to develop novel services using X Reality (XR) technology such as AR (Augmented Reality).

For example, as illustrated in FIG. 3, a service that allows a user to see visual information representative of an anchor, local information, store information, or the like placed on a map indicated by map data provided by the map service 18 at a real-world position corresponding to the geographic position on the map can be achieved. In FIG. 3, as exemplary visual information that the user can see, a name image 60 indicating a tower name "XX tower" is illustrated.

Figure 4:
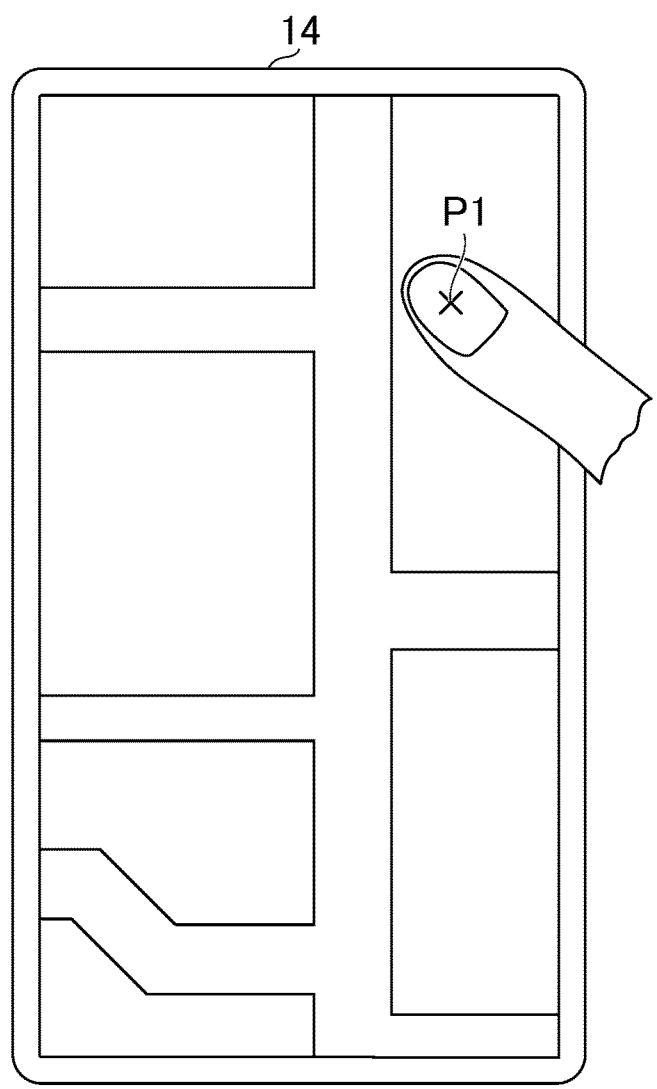
FIG. 4 is a diagram illustrating an example of how a user performs an operation for designating a geographic position on a map displayed on the terminal.
Figure 5:
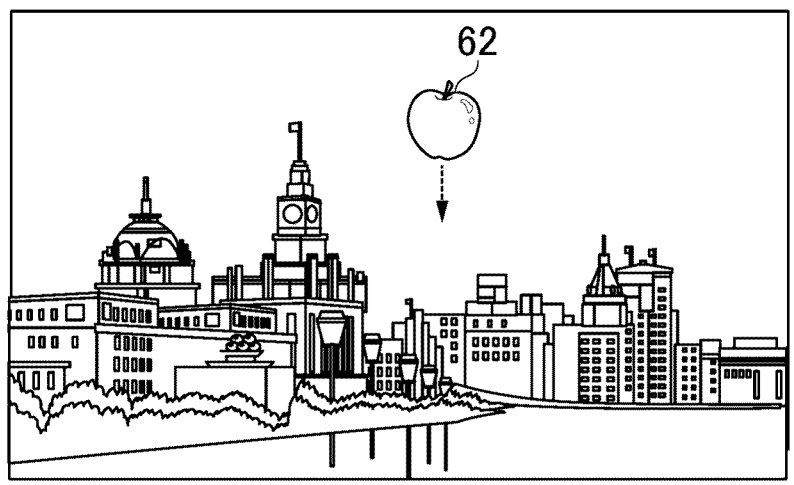
FIG. 5 is a diagram illustrating an example of how a mark is seen.

Further, for example, a service that allows, in response to a user operation for designating a geographic position P1 on a map displayed on the display unit 46 of the terminal 14 as illustrated in FIG. 4, the user to see visual information, such as a mark 62, at a real-world position corresponding to the designated geographic position as illustrated in FIG. 5 can be achieved. In the example of FIG. 5, as an example of the mark 62, an apple image is illustrated, and this service allows the user to see the apple image falling, for example.

However, while a geographic position such as a position indicated on a map is expressed by a geographic coordinate system with latitude, longitude, altitude, or the like, a user's position in an environmental map estimated by using SLAM technology is expressed by a Euclidean coordinate system with an X coordinate value, a Y coordinate value, a Z coordinate value, or the like.

Since a geographic position and a user's position in an environmental map estimated by using SLAM technology are expressed by different coordinate systems in such a way, in the related art, a given geographic position has not been able to be accurately mapped on an environmental map.

Accordingly, the present embodiment makes it possible to accurately map a given geographic position on an environmental map as follows.

Further, in the related art, since a given geographic position has not been able to be accurately mapped on an environmental map, visual information has not been able to be accurately displayed at a real-world position corresponding to the given geographic position.

Accordingly, the present embodiment makes it possible to accurately display visual information at a real-world position corresponding to a given geographic position as follows.

In the below, the functions of the tracker 12 and the server 16 according to the present embodiment and processing that is executed in the environmental map management system 1 are further described.

Figure 6A:
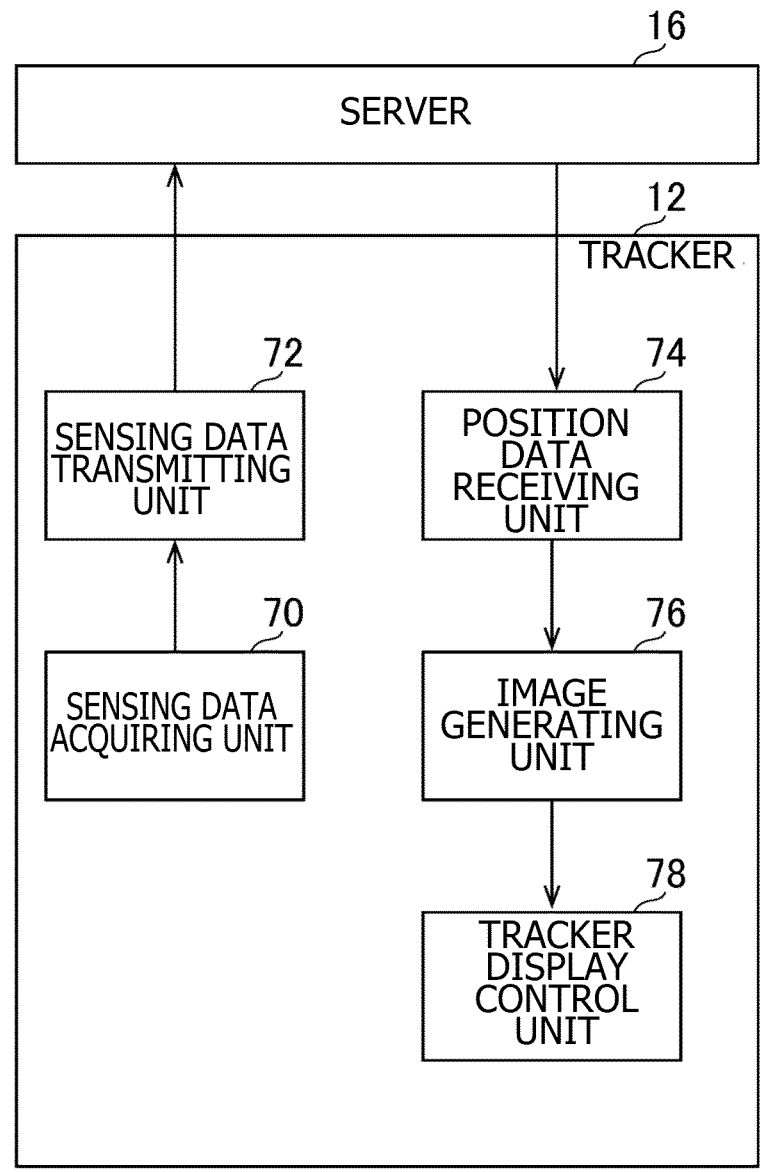
FIG. 6A is a functional block diagram illustrating exemplary functions that are implemented in the tracker according to the embodiment of the present invention.

FIG. 6A is a functional block diagram illustrating exemplary functions that are implemented in the tracker 12 according to the present embodiment. Note that, in the tracker 12 according to the present embodiment, all the functions illustrated in FIG. 6A are not required to be implemented and functions other than the functions illustrated in FIG. 6A may be implemented.

As illustrated in FIG. 6A, the tracker 12 functionally includes, for example, a sensing data acquiring unit 70, a sensing data transmitting unit 72, a position data receiving unit 74, an image generating unit 76, and a tracker display control unit 78. The sensing data acquiring unit 70 is implemented by using the processor 30 and the sensor unit 38 as its main parts. The sensing data transmitting unit 72 and the position data receiving unit 74 are implemented by using the communication unit 34 as their main parts. The image generating unit 76 is implemented by using the processor 30 as its main part. The tracker display control unit 78 is implemented by using the processor 30 and the display unit 36 as its main parts.

The functions described above may be implemented by the processor 30 executing a program installed on the tracker 12, which is a computer, and including instructions corresponding to the functions described above. This program may be supplied to the tracker 12 through a computer-readable information storage medium such as an optical disc, a magnetic disk, a magnetic tape, a magneto-optical disk, or a flash memory or through the Internet or the like, for example.

Figure 6B:
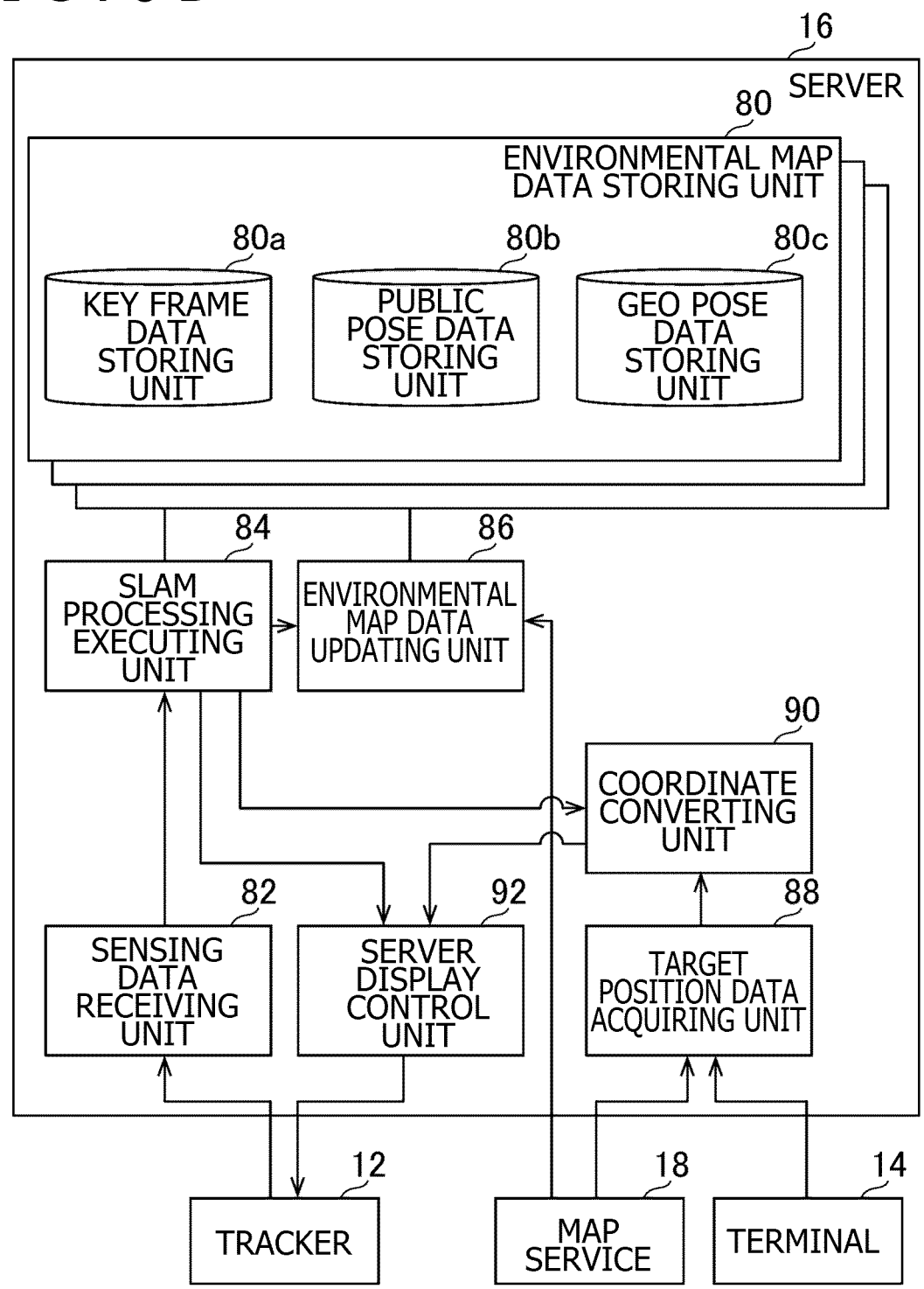
FIG. 6B is a functional block diagram illustrating exemplary functions that are implemented in the server according to the embodiment of the present invention.

FIG. 6B is a functional block diagram illustrating exemplary functions that are implemented in the server 16 according to the present embodiment. Note that, in the server 16 according to the present embodiment, all the functions illustrated in FIG. 6B are not required to be implemented and functions other than the functions illustrated in FIG. 6B may be implemented.

As illustrated in FIG. 6B, the server 16 functionally includes, for example, an environmental map data storing unit 80, a sensing data receiving unit 82, a SLAM processing executing unit 84, an environmental map data updating unit 86, a target position data acquiring unit 88, a coordinate converting unit 90, and a server display control unit 92. The environmental map data storing unit 80 is implemented by using the storage unit 52 as its main part. The sensing data receiving unit 82, the target position data acquiring unit 88, and the server display control unit 92 are implemented by using the communication unit 54 as their main parts. The SLAM processing executing unit 84, the environmental map data updating unit 86, and the coordinate converting unit 90 are implemented by using the processor 50 as their main parts.

Further, as illustrated in FIG. 6B, the server 16 according to the present embodiment includes the plurality of environmental map data storing units 80. Further, the plurality of environmental map data storing units 80 each include a key frame data storing unit 80a, a public pose data storing unit 80b, and a geo pose data storing unit 80c. Further, in the present embodiment, for example, the plurality of environmental map data storing units 80 are associated with respective geographic ranges (for example, combinations of latitude ranges and longitude ranges) in advance. Thus, in the present embodiment, on the basis of a geographic position, one of the plurality of environmental map data storing units 80 associated with a geographic range including the geographic position in question can be identified.

The functions described above may be implemented by the processor 50 executing a program installed on the server 16, which is a computer, and including instructions corresponding to the functions described above. This program may be supplied to the server 16 through a computer-readable information storage medium such as an optical disc, a magnetic disk, a magnetic tape, a magneto-optical disk, or a flash memory or through the Internet or the like, for example.

The environmental map data storing unit 80 of the present embodiment stores, for example, environmental map data indicating an environmental map in which a position expressed by the Euclidean coordinate system is associated with a position expressed by the geographic coordinate system. Environmental map data according to the present embodiment includes, for example, key frame data (see FIG. 7), public pose data (see FIG. 8), and geo pose data (see FIG. 9). Key frame data is stored in the key frame data storing unit 80a. Public pose data is stored in the public pose data storing unit 80b. Geo pose data is stored in the geo pose data storing unit 80c.

Figure 7:
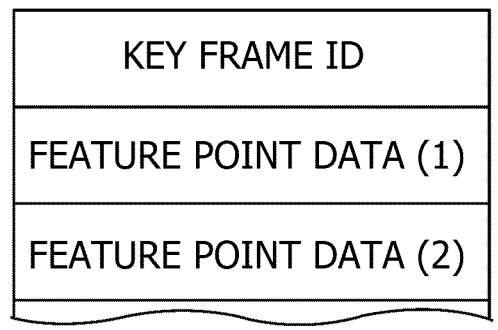
FIG. 7 is a diagram illustrating an exemplary data structure of key frame data.

FIG. 7 is a diagram illustrating an exemplary data structure of key frame data. As illustrated in FIG. 7, key frame data includes, for example, a key frame ID (Identification) and a plurality of pieces of feature point data (feature point data (1), feature point data (2), etc.).

Figure 8:
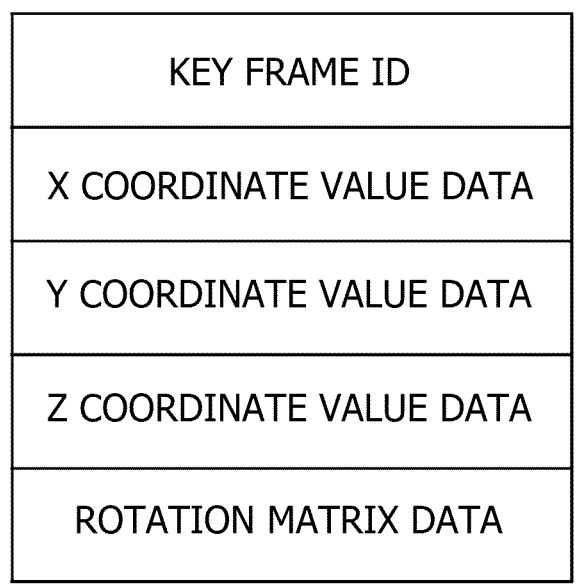
FIG. 8 is a diagram illustrating an exemplary data structure of public pose data.

FIG. 8 is a diagram illustrating an exemplary data structure of public pose data. As illustrated in FIG. 8, public pose data includes, for example, a key frame ID, X coordinate value data, Y coordinate value data, Z coordinate value data, and rotation matrix data.

Figure 9:
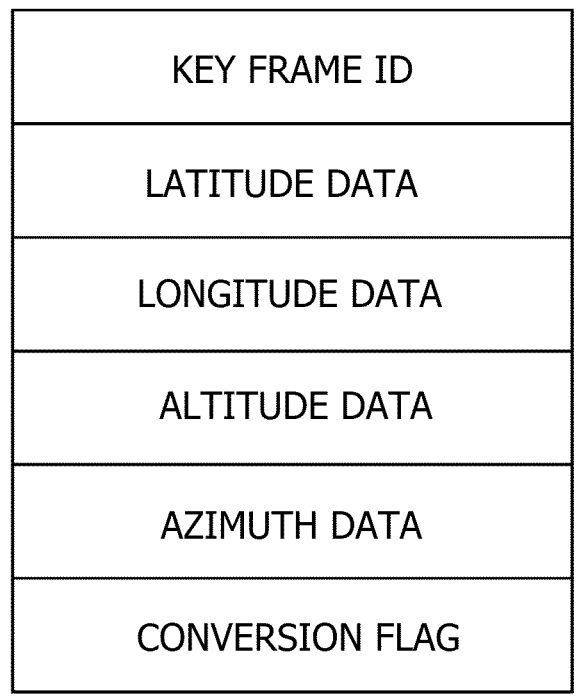
FIG. 9 is a diagram illustrating an exemplary data structure of geo pose data.

FIG. 9 is a diagram illustrating an exemplary data structure of geo pose data. Geo pose data includes, for example, a key frame ID, latitude data, longitude data, altitude data, azimuth data, and a conversion flag.

Key frame data according to the present embodiment is, for example, data indicating a set of feature points associated with sensing data indicating the result of sensing by the sensor unit 38 of the tracker 12.

Public pose data and geo pose data are data indicating the position and the orientation of the tracker 12 during sensing associated with key frame data. While public pose data expresses a position and an orientation by the Euclidean coordinate system with an X coordinate value, a Y coordinate value, a Z coordinate value, or the like, geo pose data expresses a position and an orientation by the geographic coordinate system with latitude, longitude, altitude, or the like.

In the present embodiment, when key frame data is generated in response to sensing by the tracker 12, public pose data and geo pose data indicating the position and the orientation of the tracker 12 during the sensing are also generated.

A key frame ID included in key frame data is identification information regarding the key frame data. Here, for example, a key frame ID included in key frame data may be a number indicating the order of sensing associated with the key frame data in question.

Further, in the present embodiment, a key frame ID included in public pose data is set to the same value as the key frame ID of key frame data associated with the public pose data in question. Further, a key frame ID included in geo pose data is set to the same value as the key frame ID of key frame data associated with the geo pose data in question. In such a way, sensing data, key frame data, public pose data, and geo pose data are associated with each other.

Feature point data included in key frame data is data indicating the attributes of a feature point, such as the position of a feature point, identified on the basis of sensing data acquired by the tracker 12. In the present embodiment, key frame data includes a plurality of pieces of feature point data associated with feature points different from each other. Here, for example, key frame data includes as many pieces of feature point data as feature points identified by SLAM processing based on one-time sensing by the tracker 12.

Feature point data included in key frame data includes, for example, the three-dimensional coordinate values (for example, an X coordinate value, a Y coordinate value, and a Z coordinate value) of the position of a feature point corresponding to the feature point data in question relative to an origin at a position and an orientation indicated by public pose data corresponding to the key frame data in question. Further, feature point data includes color information indicating the colors of the surroundings of a feature point corresponding to the feature point data in question.

Note that, key frame data may include, other than data as described above, sensing data acquired by the tracker 12, for example.

An X coordinate value data value, a Y coordinate value data value, and a Z coordinate value data value included in public pose data are set to the X coordinate value, the Y coordinate value, and the Z coordinate value of the position of the tracker 12 during sensing associated with the public pose data in question, respectively. In the present embodiment, for example, an X coordinate value data value, a Y coordinate value data value, and a Z coordinate value data value are in units of meters. Rotation matrix data included in public pose data is set to the value of a rotation matrix indicating the orientation of the tracker 12 during sensing associated with the public pose data in question.

A latitude data value, a longitude data value, and an altitude data value included in geo pose data are set to the latitude value, the longitude value, and the altitude value of the position of the tracker 12 during sensing associated with the geo pose data in question, respectively. An azimuth data value included in geo pose data is set to a value indicating the direction in which the tracker 12 has faced during sensing associated with the geo pose data in question.

In the present embodiment, for example, with regard to latitude data, the value range is from −90 to 90, the accuracy is a double equivalent, and the unit is degree. Further, with regard to longitude data, the value range is from −180 to 180, the accuracy is a double equivalent, and the unit is degree. Further, with regard to altitude data, a value indicates a height from the Tokyo Bay mean sea level for Japan and the unit is meter. Further, with regard to azimuth data, the value range is from 0 to 360 and the unit is degree. Azimuth data is set to a value indicating an azimuth with a value of 0 indicating a north direction and a value of 180 indicating a south direction.

As described above, the server 16 according to the present embodiment includes the plurality of environmental map data storing units 80. Further, the plurality of environmental map data storing units 80 store respective pieces of environmental map data indicating environmental maps different from each other in position expressed by the geographic coordinate system and associated with the origin of the Euclidean coordinate system.

The sensing data acquiring unit 70 of the present embodiment acquires, for example, sensing data indicating the result of sensing by the sensor unit 38.

Sensing data acquired by the sensing data acquiring unit 70 may include, for example, an image taken by the camera included in the sensor unit 38 of the tracker 12.

Further, sensing data acquired by the sensing data acquiring unit 70 may include depth data measured by the camera or depth sensor included in the sensor unit 38 of the tracker 12.

Further, sensing data acquired by the sensing data acquiring unit 70 may include data indicating the orientation of the tracker 12 measured by the geomagnetic sensor or gyrocompass included in the sensor unit 38 of the tracker 12.

Further, sensing data acquired by the sensing data acquiring unit 70 may include data indicating the acceleration, rotation amount, movement amount, or the like of the tracker 12 measured by the inertial sensor included in the sensor unit 38.

Further, sensing data acquired by the sensing data acquiring unit 70 may include data indicating the latitude and longitude of the tracker 12 measured by the GPS module included in the sensor unit 38.

Further, sensing data acquired by the sensing data acquiring unit 70 may include data indicating altitude measured by the altitude sensor included in the sensor unit 38.

Further, sensing data acquired by the sensing data acquiring unit 70 may include a set of feature points (key frame).

Note that, to enhance the accuracy of latitude and longitude indicated by sensing data, the tracker 12 may utilize a position estimation service using hotspots, the identifiers of 5G mobile edge servers, or the like.

The sensing data transmitting unit 72 of the present embodiment transmits, for example, sensing data acquired by the sensing data acquiring unit 70 to the server 16.

The sensing data receiving unit 82 of the present embodiment receives, for example, sensing data transmitted from the tracker 12.

The SLAM processing executing unit 84 of the present embodiment executes, for example, SLAM processing on the basis of sensing data received by the sensing data receiving unit 82. SLAM processing according to the present embodiment includes, for example, the generation processing of environmental map data (key frame data, public pose data, and geo pose data). Further, the SLAM processing includes self-localization processing for estimating, on the basis of sensing data acquired by the tracker 12 and environmental map data as described above, the position of the tracker 12 expressed by the Euclidean coordinate system. Note that, the SLAM processing may include relocalization processing, loop closing processing, 3D-mesh processing, object recognition processing, or the like.

Further, the SLAM processing may include plane detection/3D-mesh segmentation processing. Plane detection/3D-mesh segmentation processing indicates processing for detecting a continuous plane such as ground or a wall and segmenting the entire 3D mesh into individual 3D meshes such as ground, buildings, or trees. Further, the SLAM processing may include 3D-mesh optimization processing. 3D-mesh optimization processing indicates processing for removing, from a 3D mesh, a portion estimated as a moving object or contamination induced by noise or the like, reducing the number of polygons, or smoothing the surface of a mesh. Further, the SLAM processing may include texture generation processing. Texture generation processing indicates processing for generating a texture image for a 3D mesh on the basis of the colors of the vertices of the mesh.

In the present embodiment, for example, X coordinate value data, Y coordinate value data, Z coordinate value data, and rotation matrix data included in public pose data generated by the SLAM processing executing unit 84 are set to respective provisional values. Those values are, as described later, updated by the environmental map data updating unit 86 to values indicating a position or an orientation expressed by a shared Euclidean coordinate system described later.

For example, a position indicated by each of X coordinate value data, Y coordinate value data, and Z coordinate value data included in generated public pose data is expressed by a coordinate system unique to the tracker 12 that has generated sensing data associated with the public pose data in question. For example, the value of X coordinate value data is set so that the left-hand direction of the tracker 12 when the tracker 12 is activated corresponds to a positive direction. Further, the value of Y coordinate value data is set so that the vertically upward direction of the tracker 12 when the tracker 12 is activated corresponds to a positive direction. Further, the value of Z coordinate value data is set so that the front direction of the tracker 12 when the tracker 12 is activated corresponds to a positive direction.

Further, an orientation indicated by rotation matrix data included in generated public pose data is also expressed by a coordinate system unique to the tracker 12 that has generated sensing data associated with the public pose data in question. For example, the value of rotation matrix data is set so that the front direction of the tracker 12 when the tracker 12 is activated corresponds to an identity matrix.

Further, latitude data, longitude data, altitude data, and azimuth data included in geo pose data generated by the SLAM processing executing unit 84 are set to respective provisional values. Those values are updated to more accurate values by the environmental map data updating unit 86 as described later. Further, the value of a conversion flag included in the geo pose data in question is set to 0.

For example, a latitude data value, a longitude data value, an altitude data value, and an azimuth data value included in geo pose data are set to the latitude value, the longitude value, the altitude value, and the azimuth value indicated by sensing data associated with the geo pose data in question, respectively. The accuracy of geo pose data generated on the basis of sensing data depends on the accuracy of sensing by the tracker 12 and is generally not enough to accurately associate an environmental map with a map indicated by map data provided by the map service 18.

Further, by using image recognition technology or the like, a predetermined landmark may be detected from an image taken by the tracker 12. Then, by referring to a map provided by the map service 18, the geographic position, such as latitude and longitude, of the landmark in question may be identified. Then, a value indicating the geographic position identified in such a way may be set as the provisional value of generated geo pose data.

Then, the SLAM processing executing unit 84 determines, on the basis of the geographic position identified on the basis of the sensing data acquired by the tracker 12, environmental map data associated with the geographic position in question from the plurality of pieces of environmental map data stored in the respective plurality of environmental map data storing units 80.

For example, the SLAM processing executing unit 84 identifies, on the basis of a geographic position indicated by the value of geo pose data set in such a way, the environmental map data storing unit 80 associated with a geographic range including the geographic position in question from the plurality of environmental map data storing units 80.

Then, the SLAM processing executing unit 84 stores the generated key frame data in the key frame data storing unit 80a included in the identified environmental map data storing unit 80. Further, the SLAM processing executing unit 84 stores the generated public pose data in the public pose data storing unit 80b included in the identified environmental map data storing unit 80. Further, the SLAM processing executing unit 84 stores the generated geo pose data in the geo pose data storing unit 80c included in the identified environmental map data storing unit 80.

Note that, the SLAM processing executing unit 84 may determine whether the registration of generated key frame data is required or not on the basis of environmental map data already stored in the identified environmental map data storing unit 80. Then, when determining that the registration of the key frame data is required, the SLAM processing executing unit 84 may store the generated key frame data, public pose data, and geo pose data in the environmental map data storing unit 80.

The environmental map data updating unit 86 of the present embodiment executes, for example, the update processing of geo pose data and public pose data.

The environmental map data updating unit 86 estimates, for example, on the basis of a set of feature points included in an environmental map indicated by environmental map data and a map indicated by given map data provided by the given map service 18, a position and an orientation expressed by the geographic coordinate system and corresponding to the set of feature points in question.

Figure 10:
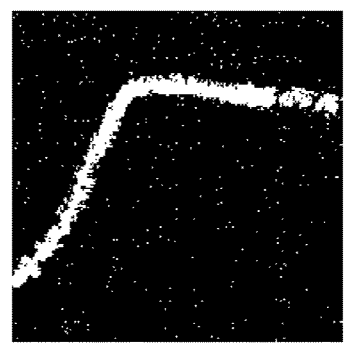
FIG. 10 is a diagram illustrating an exemplary original projection image.

Here, for example, the environmental map data updating unit 86 identifies key frame data associated with geo pose data including a conversion flag with a value of 0. Then, the environmental map data updating unit 86 generates an original projection image representative of a view in which a set of feature points indicated by a respective plurality of pieces of feature point data included in the identified key frame data is projected on a plane orthogonal to the gravity axis (the axis in the vertically upward direction). FIG. 10 is a diagram illustrating an exemplary original projection image generated in such a way. In FIG. 10, the feature points are expressed as black dots.

Figure 11:
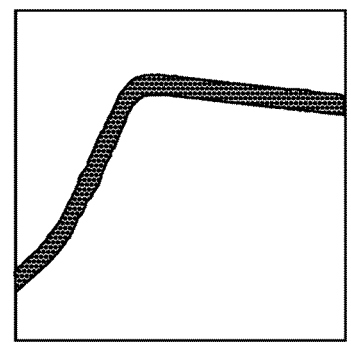
FIG. 11 is a diagram illustrating an exemplary processed projection image.

Then, the environmental map data updating unit 86 generates, by using a predetermined image processing technology such as an image processing technology using a learned machine learning model such as pix2pix, a processed projection image in which a portion estimated as a linear road on the original projection image is indicated in an identifiable manner. FIG. 11 is a diagram illustrating an exemplary processed projection image.

Then, the environmental map data updating unit 86 of the present embodiment acquires, for example, on the basis of the value of the geo pose data associated with the key frame data in question, map data representative of a map of a region having a predetermined size from the map service 18. The environmental map data updating unit 86 acquires, for example, map data representative of a map of a square region having a side length of 100 meters and centered on a geographic position corresponding to the combination of latitude indicated by the latitude data of geo pose data and longitude indicated by the longitude data thereof.

Then, the environmental map data updating unit 86 of the present embodiment generates, for example, on the basis of the acquired map data, a map image in which the road portion on the map indicated by the map data in question is indicated in an identifiable manner by using a predetermined street extraction technology.

Then, the environmental map data updating unit 86 compresses, for example, the processed projection image to generate a first projection image having a first resolution. Then, the environmental map data updating unit 86 compresses the map image to generate a first reference image having the first resolution. Here, for example, the first projection image and the first reference image are generated with a resolution of 100×100 pixels per 10-meter square region.

Then, the environmental map data updating unit 86 estimates, on the basis of the first projection image and the first reference image, an orientation expressed by the geographic coordinate system and corresponding to the set of feature points in question. For example, the first projection image is matched against the first reference image in terms of an orientation to estimate the orientation of the original projection image on the map indicated by the map data.

Then, the environmental map data updating unit 86 compresses, for example, the processed projection image to generate a second projection image having a second resolution higher than the above-mentioned first resolution. Then, the environmental map data updating unit 86 compresses the map image to generate a second reference image having the second resolution higher than the above-mentioned first resolution. Here, for example, the second projection image and the second reference image are generated with a resolution of 10,000×10,000 pixels per 10-meter square region.

Then, the environmental map data updating unit 86 estimates, on the basis of the second projection image, the second reference image, and the thus estimated orientation expressed by the geographic coordinate system and corresponding to the set of feature points in question, a position expressed by the geographic coordinate system and corresponding to the set of feature points. For example, the second projection image rotated on the basis of the orientation estimated as described above is matched against the second reference image in terms of position to estimate the position (a position in the west-east direction and a north-south direction) of the original projection image on the map indicated by the map data.

Figure 12:
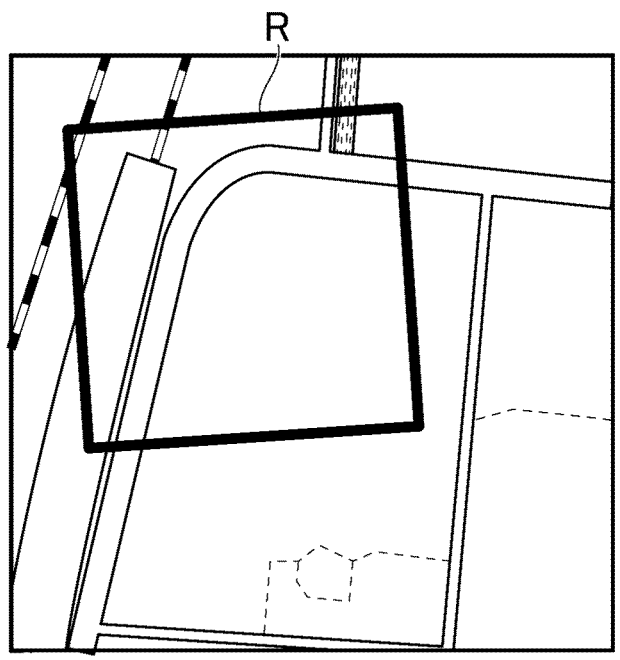
FIG. 12 is a diagram schematically illustrating an exemplary region associated with the original projection image in a map.

In such a way, the region associated with the original projection image in the map indicated by the map data, that is, the position and the orientation of the original projection image in the map indicated by the map data are estimated. FIG. 12 is a diagram schematically illustrating an example of a region R associated with the original projection image illustrated in FIG. 10. In the present embodiment, the position and the orientation expressed by the geographic coordinate system and associated with feature points indicated by a respective plurality of pieces of feature point data included in key frame data are estimated in such a way.

Then, the environmental map data updating unit 86 associates the estimated position and orientation with the set of feature points in question. For example, the environmental map data updating unit 86 updates, on the basis of the thus estimated position and orientation expressed by the geographic coordinate system and associated with the set of feature points, the value of the geo pose data associated with the key frame data indicating the set of identification points in question.

For example, on the basis of the estimated position and orientation, the latitude and the longitude of the sensing position of sensing data associated with the key frame data indicating the set of feature points in question and the azimuth of the sensing direction of the sensing data in question are estimated. Further, by referring to the map data in question, the altitude of the sensing position in question is estimated. Then, the latitude data, the longitude data, the altitude data, and the azimuth data of the geo pose data associated with the key frame data in question are updated to indicate the estimated latitude, longitude, and altitude of the sensing position and the estimated azimuth of the sensing direction, respectively.

Here, for example, the estimation of the position and the orientation associated with feature points fails in some cases. For example, the estimation fails in a case where none of roads indicated by map data corresponds to a road estimated on the basis of an original projection image. Further, for example, the estimation fails also in a case where a plurality of roads indicated by map data are identified as corresponding to a road estimated on the basis of an original projection image. Further, for example, the estimation fails also in a case where the reliability of an orientation or a position matching is low.

Here, the environmental map data updating unit 86 may set or update geo pose data with regard to which the estimation has failed to a value obtained by interpolating, in accordance with predetermined rules, the values of a plurality of (for example, two) pieces of geo pose data with regard to which the estimation has succeeded.

In the present embodiment, geo pose data is updated on the basis of given map data provided by the given map service 18 as described above.

Then, the environmental map data updating unit 86 updates, on the basis of the geo pose data updated as described above, public pose data associated with the geo pose data in question.

Here, for example, geo pose data including a conversion flag with a value of 1 and public pose data associated with the geo pose data in question are determined as reference destinations. Then, public pose data to be updated is updated to be matched with the value of the public pose data serving as a reference destination, on the basis of a difference between the value of geo pose data associated with the public pose data in question and the value of the geo pose data serving as a reference destination.

In the present embodiment, the environmental map data updating unit 86 updates public pose data to set X coordinate value data included in the public pose data in question to a value with which the east direction corresponds to a positive direction. Further, Y coordinate value data included in the public pose data in question is set to a value with which the vertically upward direction corresponds to a positive direction. Further, Z coordinate value data included in the public pose data in question is set to a value with which the north direction corresponds to a positive direction.

Here, for example, the value of public pose data is updated on the basis of the fact that a difference of one degree of latitude corresponds to 110.94297×1,000 meters and a difference of one degree of longitude corresponds to (1/360)×(cos(latitude×2π/360))×2π×6,378,137 meters (see Equations (1) and (2) below). In such a way, in the present embodiment, an update based on a transformation equation considering the fact that the length of one degree of longitude varies depending on latitude is required to be performed.

Note that, there is no reference destination for public pose data stored in the environmental map data storing unit 80 first. The X coordinate value data value, the Y coordinate value data value, and the Z coordinate value data value of such public pose data may be set to predetermined values (for example, 0 or values set during data generation).

Further, with the update of the public pose data by the environmental map data updating unit 86, rotation matrix data included in the public pose data in question is updated to a value with which the horizontal north direction corresponds to an identity matrix.

The public pose data updated in such a way expresses a position and an orientation by a metric Euclidean coordinate system common to other public pose data already registered.

In the present embodiment, with regard to each of the plurality of trackers 12, the processing described above is executed on the basis of sensing data transmitted from the tracker 12 in question. As result, updated public pose data expresses a position and an orientation by the Euclidean coordinate system shared by the plurality of user systems 10 that access the environmental map data storing unit 80 in which the public pose data in question is stored. In the following, the Euclidean coordinate system shared by the plurality of user systems 10 in such a way is referred to as "shared Euclidean coordinate system." Further, updated geo pose data expresses a position and an orientation by the geographic coordinate system shared by the plurality of user systems 10.

Then, the environmental map data updating unit 86 updates the value of the conversion flag included in the geo pose data associated with the public pose data updated as described above to 1.

In the present embodiment, as described above, the SLAM processing executing unit 84 executes self-localization processing. In self-localization processing, for example, the position and the orientation of the tracker 12 are estimated by using SLAM technology on the basis of sensing data received by the sensing data receiving unit 82 and environmental map data stored in the environmental map data storing unit 80. Here, for example, the SLAM processing executing unit 84 estimates the position and the orientation of the tracker 12 expressed by the shared Euclidean coordinate system.

Here, the SLAM processing executing unit 84 may identify a single piece of environmental map data on the basis of sensing data acquired by the tracker 12 from the plurality of pieces of environmental map data stored in the respective plurality of environmental map data storing units 80. For example, environmental map data stored in the environmental map data storing unit 80 associated with a geographic range including a geographic position indicated by sensing data acquired by the tracker 12 may be identified. Then, on the basis of the identified environmental map data and the sensing data in question, the position of the tracker 12 expressed by the shared Euclidean coordinate system in the environmental map data in question may be estimated.

Further, the SLAM processing executing unit 84 also estimates the position and the orientation of the tracker 12 expressed by the geographic coordinate system if the geo pose data-based estimation of the position and the orientation of the tracker 12 expressed by the geographic coordinate system is possible. For example, the SLAM processing executing unit 84 may estimate the position and the orientation of the tracker 12 expressed by the geographic coordinate system in a case where the value of the conversion flag of geo pose data associated with key frame data referred to in SLAM processing is 1.

Key frame data according to the present embodiment is associated with not only public pose data expressing a position and an orientation by the shared Euclidean coordinate system but also geo pose data expressing a position and an orientation by the geographic coordinate system. Thus, not only the position and the orientation of the tracker 12 expressed by the shared Euclidean coordinate system but also the position and the orientation of the tracker 12 expressed by the geographic coordinate system can be accurately estimated. Note that, here, the position and the orientation of the tracker 12 expressed by the geographic coordinate system may be estimated on the basis of the fact that a difference of one degree of latitude corresponds to 110.94297×1,000 meters and a difference of one degree of longitude corresponds to (1/360)×(cos(latitude×2π/360))×2π× 6,378,137 meters as described above.

Then, in the present embodiment, for example, the SLAM processing executing unit 84 generates and holds, every time the position and the orientation of the tracker 12 are estimated, tracker position data indicating the position and the orientation in question. Here, tracker position data may indicate the position and the orientation of the tracker 12 expressed by one or both of the shared Euclidean coordinate system and the geographic coordinate system.

The target position data acquiring unit 88 of the present embodiment acquires, for example, target position data indicating a position expressed by the geographic coordinate system. In the following, a position expressed by the geographic coordinate system and indicated by target position data is referred to as "target position." Here, for example, the target position data acquiring unit 88 may acquire target position data indicating the position expressed by the geographic coordinate system of an object corresponding to visual information to be displayed at a corresponding real-world position.

For example, the target position data acquiring unit 88 acquires, from the map service 18, target position data indicating a geographic position associated with an object, such as an anchor, an area, or a facility (a store or the like), that meets predetermined conditions on a map indicated by map data. Here, the target position data acquiring unit 88 may acquire target position data associated with registered data registered on the map service 18 in association with a target position. Examples of registered data include the comments and rating of target positions, icon images, 3D models, characters, links (links to audio data, video, or web pages), QR codes (registered trademark), and operable scripts.

Further, the target position data acquiring unit 88 may acquire target position data associated with name data indicating a name corresponding to a target position such as the name of an object, such as an anchor, an area, or a facility, that corresponds to the target position. Note that, name data may be data registered on the map service 18 in association with a target position, that is, registered data as described above.

Further, the target position data acquiring unit 88 may acquire, in response to a user operation for designating a target position on a map displayed on the terminal 14 different from the tracker 12, target position data indicating the designated target position. For example, the target position data acquiring unit 88 may receive, from the terminal 14, target position data indicating the geographic position P1 designated by the user on a map displayed on the terminal 14 as illustrated in FIG. 4. Note that, the target position data may be associated with registered data or name data as described above.

The coordinate converting unit 90 of the present embodiment identifies, for example, a target position expressed by the Euclidean coordinate system on the basis of target position data acquired by the target position data acquiring unit 88 and environmental map data stored in the environmental map data storing unit 80.

Here, the coordinate converting unit 90 may identify a target position expressed by the Euclidean coordinate system on the basis of target position data, the position of the tracker 12 expressed by the Euclidean coordinate system, and the position of the tracker 12 expressed by the geographic coordinate system.

Further, the coordinate converting unit 90 may identify one of the plurality of pieces of environmental map data stored in the respective plurality of environmental map data storing units 80 on the basis of target position data. For example, environmental map data stored in the environmental map data storing unit 80 associated with a geographic range including a geographic position indicated by target position data may be identified. Then, on the basis of the identified environmental map data and the sensing data in question, a target position expressed by the Euclidean coordinate system in the environmental map data in question may be identified.

For example, the SLAM processing executing unit 84 estimates the latest position and orientation of the tracker 12 expressed by the shared Euclidean coordinate system and the latest position and orientation of the tracker 12 expressed by the geographic coordinate system.

In this case, for example, the coordinate converting unit 90 first calculates, with Equations (1) to (4) below, a position PG obtained by converting the position of the tracker 12 expressed by the geographic coordinate system to a standard Euclidean coordinate system and a quaternion RG corresponding to an orientation obtained by converting the orientation (rotation matrix) of the tracker 12 expressed by the geographic coordinate system to the standard Euclidean coordinate system. Here, the standard Euclidean coordinate system indicates a Euclidean coordinate system with the origin at a position corresponding to a latitude of 0 degrees, a longitude of 0 degrees, and an altitude of 0 degrees.

$$(X \text{ coordinate value of } PG) = -((\text{estimated longitude of tracker } 12)/360) \times (\cos(\text{estimated latitude of tracker } 12 \times 2\pi/360)) \times 2\pi \times 6{,}378{,}137 [m] \quad (1)$$

In such a way, the X coordinate value of PG is calculated by considering the fact that the length of one degree of longitude varies depending on latitude. Note that, 6,378,137 [m] is the value of the equatorial radius of the earth.

$$(Y \text{ coordinate value of } PG) = (\text{estimated altitude of tracker } 12)[m] \quad (2)$$

$$(Z \text{ coordinate value of } PG) = (\text{estimated latitude of tracker } 12) \times 110.94297 \times 1{,}000[m] \quad (3)$$

Note that, 110.94297×1,000 [m] is a value indicating the length of one degree of latitude.

$$RG=\text{Quaternion }(0,(\text{estimated azimuth of tracker }12)\times 2\pi,0) \quad (4)$$

From Equation (4), rotation information (quaternion) in which only the yaw component is designated is generated.

Then, the coordinate converting unit 90 calculates, with Equations (5) to (7) below, a position GP1 obtained by converting the target position expressed by the geographic coordinate system to the standard Euclidean coordinate system.

$$(X \text{ coordinate value of } GP1)=-((\text{longitude of target position})/360)\times(\cos(\text{latitude of target position}\times 2\pi/360))\times 2\pi\times 6,378,137[m] \quad (5)$$

$$(Y \text{ coordinate value of } GP1)=(\text{altitude of target position})[m] \quad (6)$$

$$(Z \text{ coordinate value of } GP1)=(\text{latitude of target position})\times 110.94297\times 1,000[m] \quad (7)$$

Then, the coordinate converting unit 90 calculates, with Equations (8) to (11) below, a position PP1 obtained by converting the target position expressed by the geographic coordinate system to the shared Euclidean coordinate system. In the following description, the position of the tracker 12 expressed by the shared Euclidean coordinate system is denoted by PP, and a quaternion corresponding to the orientation of the tracker 12 expressed by the shared Euclidean coordinate system is denoted by RP.

$$RPy=RP.\text{getYaw}(\,) \quad (8)$$

From Equation (8), the yaw component of the quaternion RP is extracted.

$$\Delta Rgp=(RG\hat{\,}-1)\times RPy \quad (9)$$

Here, (RGA−1) represents the inverse quaternion of the quaternion RG.

$$\Delta Pgp=(\Delta Rgp\hat{\,}-1)\times PP-PG \quad (10)$$

Here, (ΔRgp^−1) represents the inverse quaternion of the quaternion ΔRgp.

$$PP1=\Delta Rgp\times(GP1+\Delta Pgp) \quad (11)$$

In the way described above, according to the present embodiment, a target position expressed by the geographic coordinate system is accurately mapped at a position in the shared Euclidean coordinate system.

The server display control unit 92 of the present embodiment performs control so that, for example, the display unit 36 of the tracker 12 displays an image representative of a view in which visual information placed at a target position expressed by the Euclidean coordinate system is seen from the position of the tracker 12 expressed by the Euclidean coordinate system.

Here, the server display control unit 92 may perform control so that the display unit 36 displays an image representative of a view in which visual information based on registered data as described above is seen from the position of the tracker 12 expressed by the Euclidean coordinate system. Further, for example, the server display control unit 92 may perform control so that the display unit 36 displays an image representative of a view in which visual information representing a name indicated by name data as described above is seen from the position of the tracker 12 expressed by the Euclidean coordinate system.

For example, the server display control unit 92 may perform control to display a character string or image associated with target position data and being representative of the comments or a rating of the target position. Further, the server display control unit 92 may perform control to display an icon image, a 3D model, or a character associated with target position data.

Further, the server display control unit 92 may perform control to display a link (a link to audio data, video, or a web page) associated with target position data. In this case, for example, the audio data or the video may be reproduced or the Web page may be displayed in response to an operation for selecting the link in question by the user.

Further, the server display control unit 92 may perform control to display a QR code associated with target position data. In this case, in response to an operation for selecting the link in question by the user, processing depending on the result of reading the QR code in question may be executed.

Further, the server display control unit 92 may perform control to display an icon image corresponding to a script associated with target position data. In this case, the script in question may be executed in response to an operation for selecting the icon image in question by the user.

For example, the server display control unit 92 may transmit, when tracker position data is generated by the SLAM processing executing unit 84, the generated tracker position data to the tracker 12.

Further, the server display control unit 92 may generate, every time a target position expressed by the shared Euclidean coordinate system is identified by the coordinate converting unit 90, conversion target position data indicating the target position expressed by the shared Euclidean coordinate system.

Further, the server display control unit 92 may transmit, for example, when conversion target position data is generated, the generated conversion target position data to the tracker 12. Here, for example, conversion target position data indicating a target position expressed by the shared Euclidean coordinate system and identified on the basis of the latest position and orientation of the tracker 12 may be transmitted to the tracker 12 in question.

Here, the server display control unit 92 may associate name data associated with the target position data indicating the target position in question with the generated conversion target position data. Then, the server display control unit 92 may transmit the conversion target position data associated with the name data.

The position data receiving unit 74 of the present embodiment receives, for example, tracker position data transmitted from the server display control unit 92. Further, the position data receiving unit 74 of the present embodiment receives, for example, conversion target position data transmitted from the server display control unit 92.

The image generating unit 76 of the present embodiment generates, for example, an image representative of a view in which visual information placed at a target position expressed by the Euclidean coordinate system is seen from the position of the tracker 12 expressed by the Euclidean coordinate system. In the following, an image generated by the image generating unit 76 in such a way is referred to as "target image."

The tracker display control unit 78 of the present embodiment controls, for example, the display unit 36 to display a target image generated by the image generating unit 76.

Figure 13:
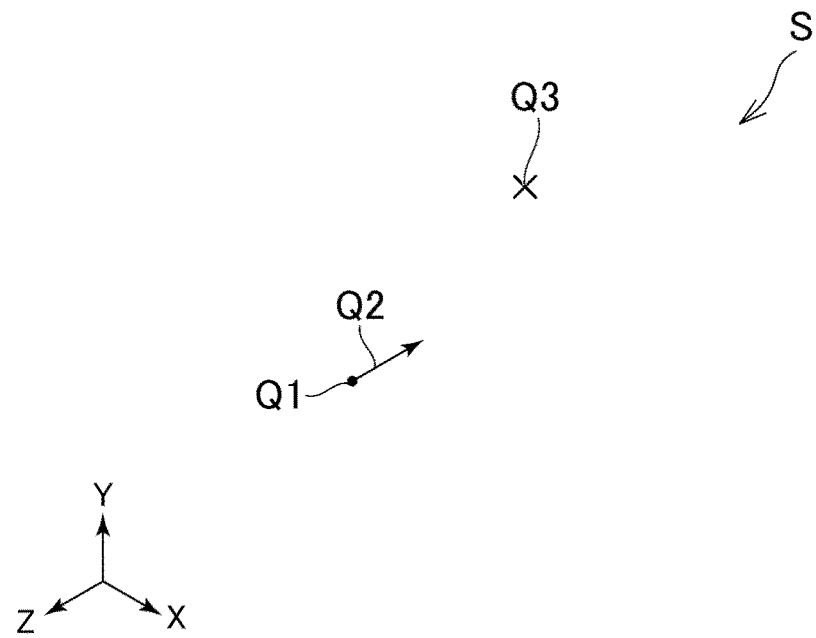
FIG. 13 is a diagram schematically illustrating an exemplary virtual space to be generated.

Here, for example, the image generating unit 76 may generate a virtual space S as illustrated in FIG. 13. In the virtual space S illustrated in FIG. 13, a position Q1 and an orientation Q2 of the tracker 12 indicated by the latest tracker position data received by the position data receiving unit 74 and a position Q3 corresponding to conversion target position data received by the position data receiving unit 74 are mapped in the shared Euclidean coordinate system. Here, the position Q3 may be a position indicated by the conversion target position data or a position shifted from the position indicated by the conversion target position data by a predetermined amount in the height direction (the positive direction of the Y axis).

Then, the image generating unit 76 may generate an image representative of a view in which the orientation Q2 is seen from the position Q1 in the virtual space S in which the name image 60 representative of the character string of a name indicated by name data associated with the conversion target position data is placed at the position Q3.

Figure 14:
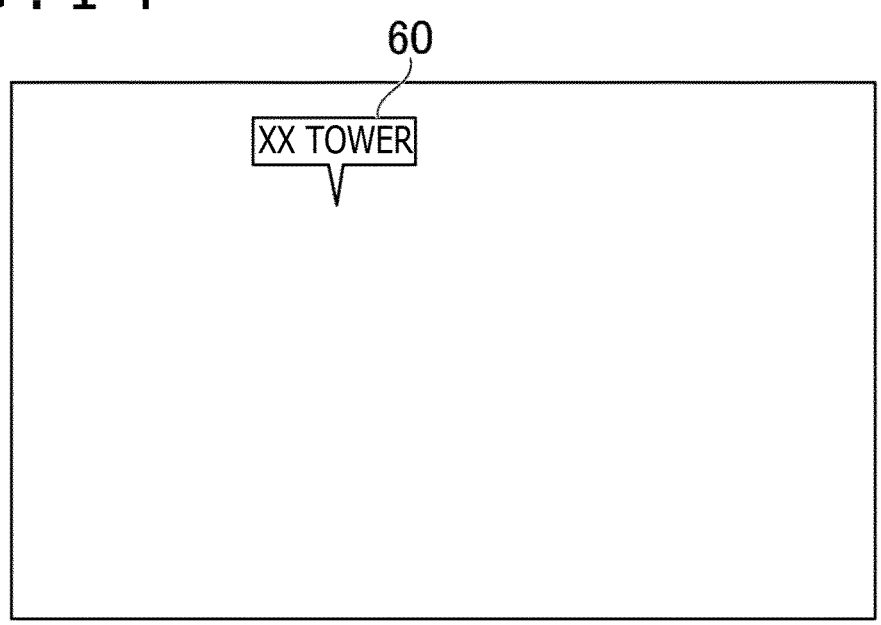
FIG. 14 is a diagram schematically illustrating an exemplary image to be generated.

Here, for example, the image generating unit 76 may generate an image representative of a view in which the orientation Q2 is seen from the position Q1 in the virtual space S in which the name image 60 representative of the character string of a name indicated by name data associated with conversion target position data is placed at the position Q3 as illustrated in FIG. 14.

Here, in a case where the tracker 12 is a video see-through head-mounted display, the image generating unit 76 may generate a target image that is an image in which an image obtained by capturing the view in front of the user by the camera included in the tracker 12 is superimposed on the image illustrated in FIG. 14. Then, the tracker display control unit 78 may control the display unit 36 to display the target image generated in such a way.

Meanwhile, in a case where the tracker 12 is an optical see-through head-mounted display, the tracker display control unit 78 may control the display unit 36 to display the image illustrated in FIG. 14 as a target image.

Figure 15:
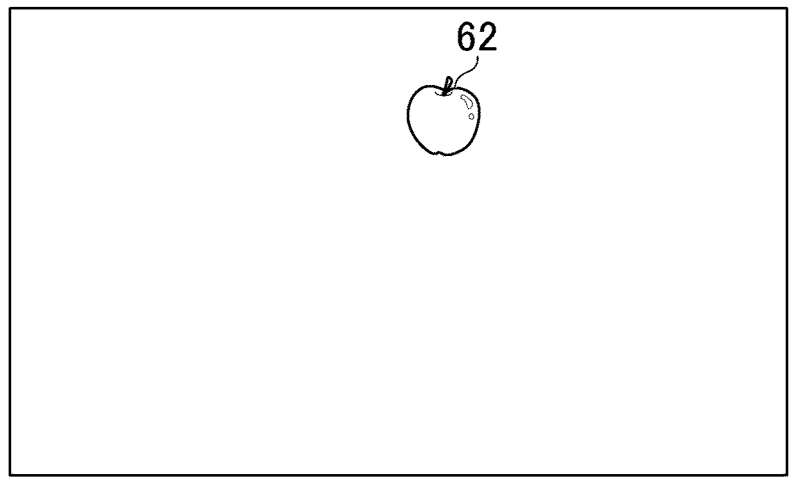
FIG. 15 is a diagram schematically illustrating an exemplary image to be generated.

Further, for example, the image generating unit 76 may generate, over a few frames, an image representative of a view in which the orientation Q2 is seen from the position Q1 in the virtual space S in which the mark 62 is placed at the position Q3 as illustrated in FIG. 15 while changing the height of the position Q3.

Here, as described above, in a case where the tracker 12 is a video see-through head-mounted display, the image generating unit 76 may generate a target image that is an image in which an image obtained by capturing the view in front of the user by the camera included in the tracker 12 is superimposed on the image illustrated in FIG. 15. Then, the tracker display control unit 78 may control the display unit 36 to display the target image generated in such a way.

Meanwhile, in a case where the tracker 12 is an optical see-through head-mounted display, the tracker display control unit 78 may control the display unit 36 to display the image illustrated in FIG. 15 as a target image.

In this case, for example, an animation representing an apple falling is displayed on the display unit 36.

Figure 16:
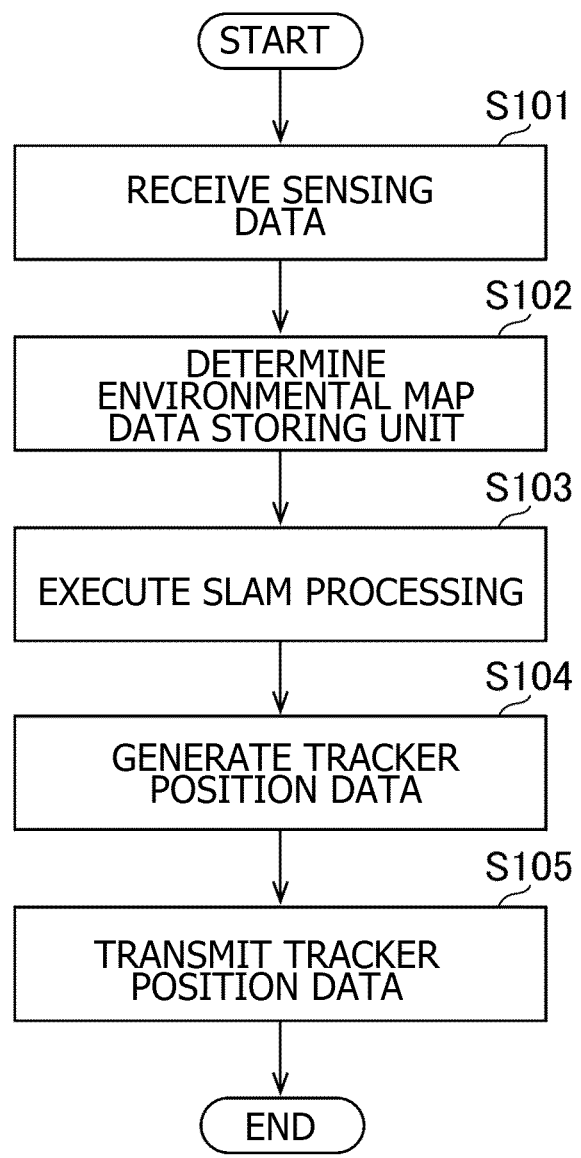
FIG. 16 is a flow chart illustrating an exemplary flow of processing that is performed in the server according to the embodiment of the present invention.

Here, an exemplary flow of the transmission processing of tracker position data that is performed in response to the reception of sensing data in the server 16 according to the present embodiment is described with reference to the flow chart of FIG. 16.

First, the sensing data receiving unit 82 receives sensing data from the tracker 12 (S101).

Then, the SLAM processing executing unit 84 determines, on the basis of the sensing data received in the processing in S101, one of the plurality of environmental map data storing units 80 corresponding to a geographic position indicated by the sensing data in question (S102).

Then, the SLAM processing executing unit 84 executes SLAM processing based on environmental map data stored in the environmental map data storing unit 80 determined in the processing in S102 and the sensing data received in the processing in S101 (S103). In the processing in S103, for example, self-localization processing for estimating the position and the orientation of the tracker 12 during sensing corresponding to the sensing data received in the processing in S101 is executed.

Here, for example, the position and the orientation of the tracker 12 expressed by the shared Euclidean coordinate system used for expressing the position and the orientation of the public pose data stored in the environmental map data storing unit 80 determined in the processing in S102 are estimated. Note that, at this time, for example, when the position and the orientation of the tracker 12 expressed by the geographic coordinate system can be estimated on the basis of the geo pose data stored in the environmental map data storing unit 80, the position and the orientation of the tracker 12 expressed by the geographic coordinate system are also estimated.

Note that, in the processing in S103, as needed, on the basis of the sensing data received in the processing in S101, key frame data and public pose data with a new key frame ID and geo pose data with the new key frame ID and including a conversion flag with a value of 0 are generated. In this case, the generated key frame data is stored in the key frame data storing unit 80a included in the environmental map data storing unit 80 determined in the processing in S102. Further, the generated public pose data is stored in the public pose data storing unit 80b included in the environmental map data storing unit 80 determined in the processing in S102. Further, the generated geo pose data is stored in the geo pose data storing unit 80c included in the environmental map data storing unit 80 determined in the processing in S102.

Then, the SLAM processing executing unit 84 generates, on the basis of the position and the orientation of the tracker 12 estimated in the processing in S103, tracker position data indicating the position and the orientation of the tracker 12 in question (S104). The tracker position data is held by the SLAM processing executing unit 84.

Then, the server display control unit 92 transmits the tracker position data generated in the processing in S104 to the tracker 12 that has transmitted the sensing data received in the processing in S101 (S105), and the processing in the present processing example ends.

Figure 17A:
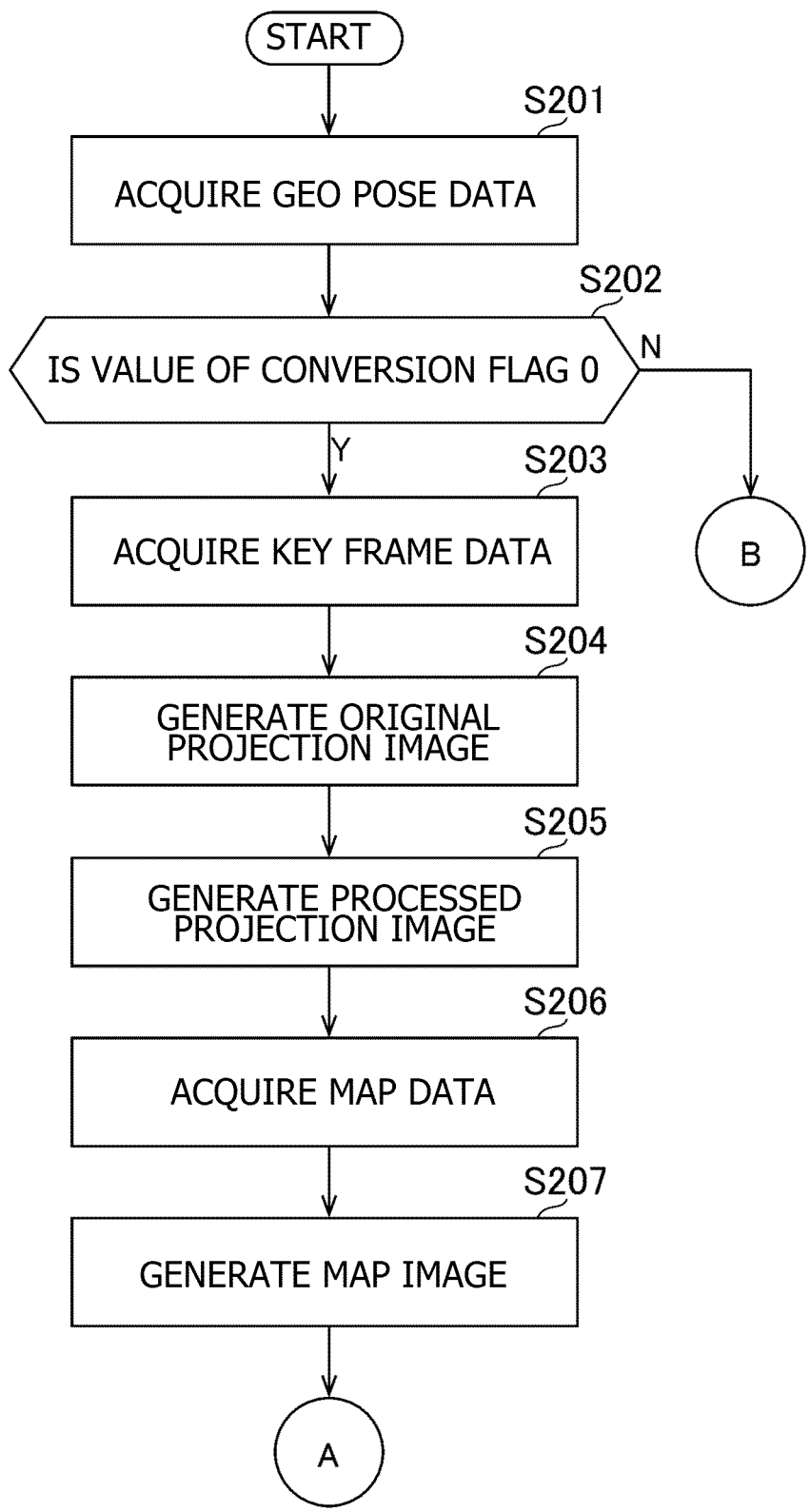
FIG. 17A is a flow chart illustrating an exemplary flow of processing that is performed in the server according to the embodiment of the present invention.
Figure 17B:
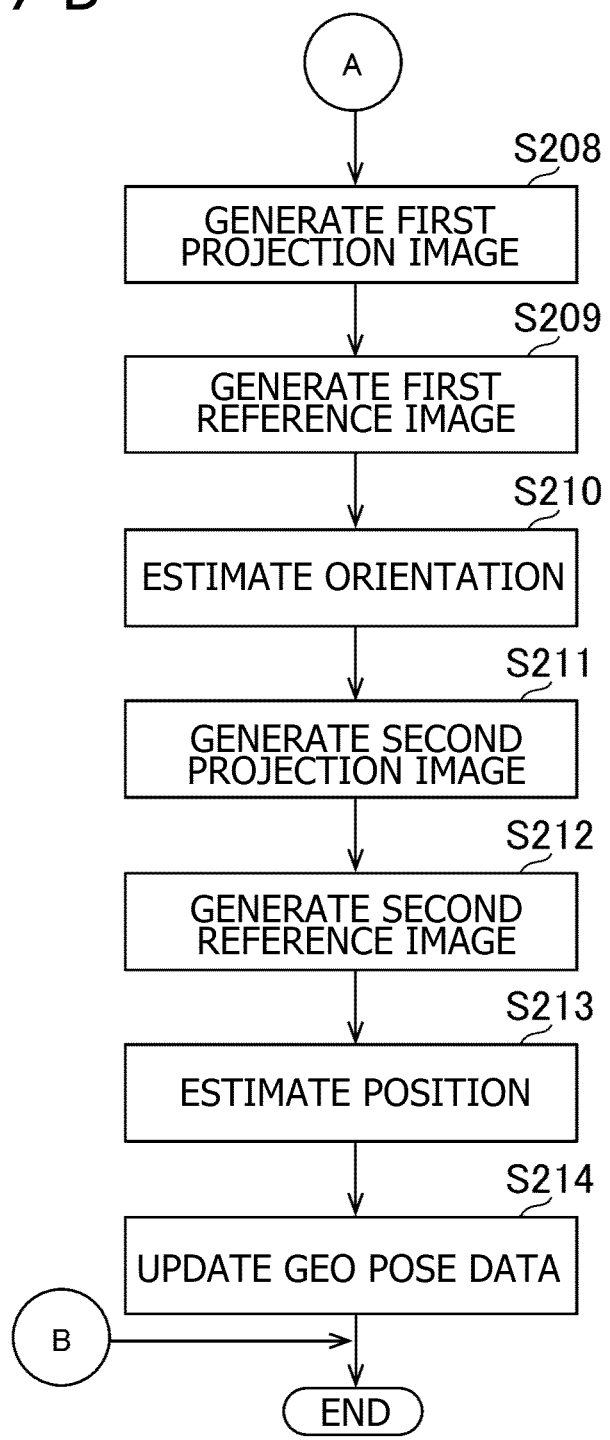
FIG. 17B is a flow chart illustrating the exemplary flow of processing that is performed in the server according to the embodiment of the present invention.

Next, an exemplary flow of the update processing of geo pose data that is performed in the server 16 according to the present embodiment is described with reference to the flow charts of FIG. 17A and FIG. 17B.

The following processing may be repeatedly executed in the background. Further, for example, when new geo pose data is stored in the geo pose data storing unit 80c, the following processing may be executed on the geo pose data in question.

First, the environmental map data updating unit 86 acquires geo pose data stored in the geo pose data storing unit 80c of the environmental map data storing unit 80 (S201). Here, as described above, geo pose data newly stored in the geo pose data storing unit 80c may be acquired.

Then, the environmental map data updating unit 86 confirms whether the value of the conversion flag of the geo pose data acquired in the processing in S201 is 0 or not (S202).

In a case where the value of the conversion flag is 1 (S202: N), the processing in the present processing example ends.

In a case where the value of the conversion flag is 0 (S201: Y), the environmental map data updating unit 86 acquires key frame data including the same key frame ID as the geo pose data acquired in the processing in S201 (S203).

Then, the environmental map data updating unit 86 generates an original projection image as described above on the basis of a set of feature points indicated by a plurality of pieces of feature point data included in the key frame data acquired in the processing in S203 (S204).

Then, the environmental map data updating unit 86 generates a processed projection image as described above on the basis of the original projection image generated in the processing in S204 (S205).

Then, the environmental map data updating unit 86 acquires, on the basis of a geographic position indicated by the geo pose data acquired in the processing in S201, map data representative of a map of a square region having a side length of 10 meters from the map service 18 (S206).

Then, the environmental map data updating unit 86 generates a map image as described above on the basis of the map data acquired in the processing in S206 (S207).

Then, the environmental map data updating unit 86 compresses the processed projection image generated in the processing in S205 to generate a first projection image having the first resolution as described above (S208).

Then, the environmental map data updating unit 86 compresses the map image generated in the processing in S207 to generate a first reference image having the first resolution as described above (S209).

Then, the environmental map data updating unit 86 estimates an orientation (rotation) expressed by the geographic coordinate system and corresponding to the set of feature points indicated by the plurality of pieces of feature point data included in the key frame data acquired in the processing in S203 (S210). In the processing in S210, for example, the first projection image is matched against the first reference image to estimate an orientation (rotation) expressed by the geographic coordinate system and corresponding to the set of feature points in question.

Then, the environmental map data updating unit 86 compresses the processed projection image generated in the processing in S205 to generate a second projection image having the second resolution as described above (S211).

Then, the environmental map data updating unit 86 compresses the map image generated in the processing in S207 to generate a second reference image having the second resolution as described above (S212).

Then, the environmental map data updating unit 86 estimates a position expressed by the geographic coordinate system and corresponding to the set of feature points indicated by the plurality of pieces of feature point data included in the key frame data acquired in the processing in S203 (S213). In the processing in S213, for example, the second projection image rotated in an orientation corresponding to the orientation (rotation) estimated in S210 is matched against the second reference image to estimate a position expressed by the geographic coordinate system and corresponding to the set of feature points in question.

Then, the environmental map data updating unit 86 updates, for example, the value of the geo pose data acquired in the processing in S201 to indicate the position estimated in the processing in S210 and the orientation (rotation) estimated in the processing in S213 (S214). In the processing in S214, the value of the conversion flag of the geo pose data acquired in the processing in S201 is also updated to 1. Then, the processing in the present processing example ends.

Figure 18:
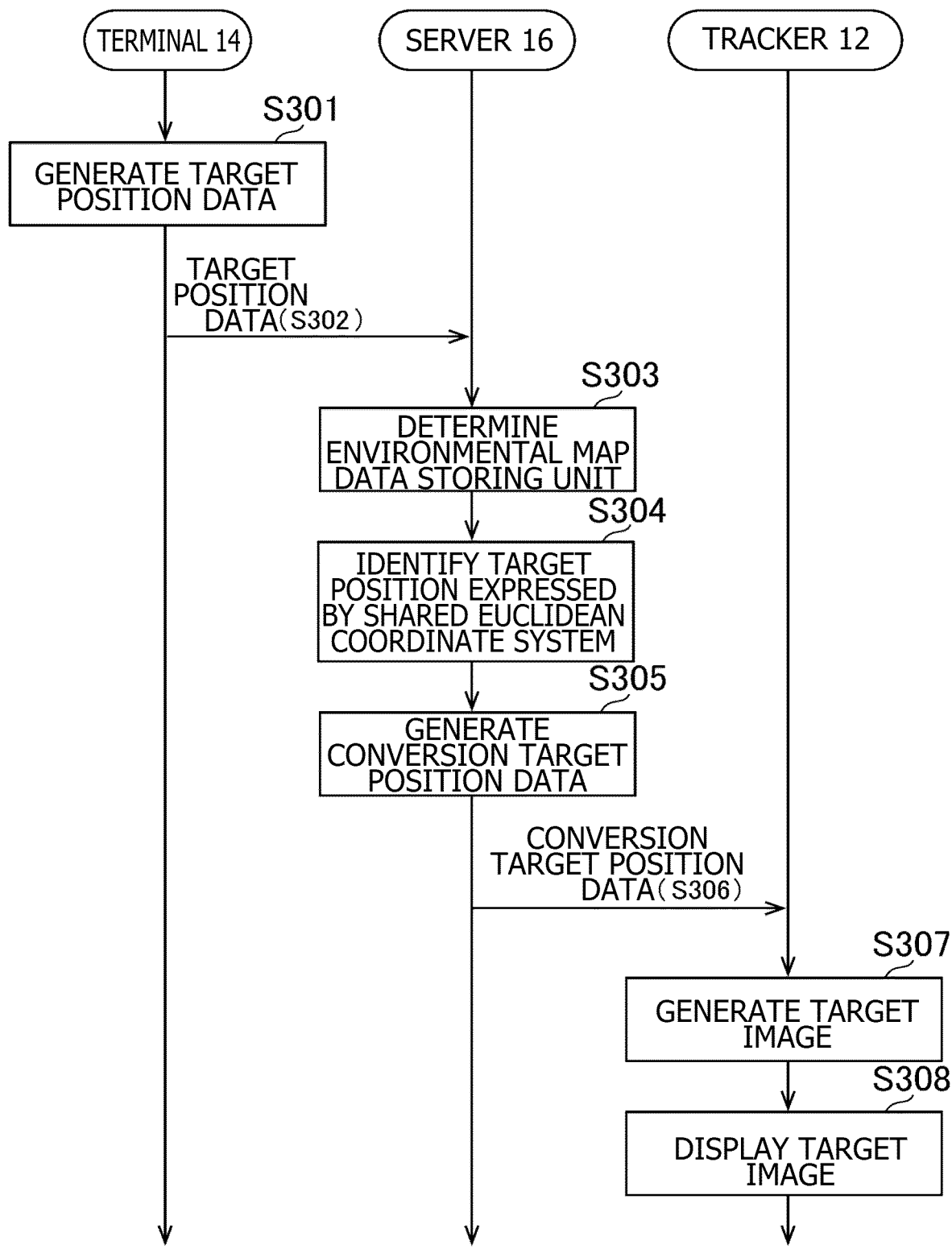
FIG. 18 is a flow chart illustrating an exemplary flow of processing that is performed in a user system and the server according to the embodiment of the present invention.

Next, an exemplary flow of the display processing of a target image that is performed in the user system 10 and the server 16 according to the present embodiment is described with reference to the flow chart of FIG. 18.

First, when the user performs a tap operation for designating a target position, which is the geographic position P1, on a map displayed on the terminal 14, the terminal 14 generates target position data indicating the target position in question (S301). In the target position data in question, the target position is expressed by the geographic coordinate system with latitude, longitude, altitude, or the like. Note that, the target position may be associated with name data.

Then, the terminal 14 transmits the target position data to the server 16, and the target position data acquiring unit 88 of the server 16 receives the target position data in question (S302).

Then, the coordinate converting unit 90 determines, on the basis of the target position data received in the processing in S302, one of the plurality of environmental map data storing units 80 corresponding to the geographic position indicated by the target position data in question (S303). Here, for example, the environmental map data storing unit 80 associated with a geographic range including the geographic position P1 expressed by the geographic coordinate system and indicated by the target position data received in S302 is determined.

Then, the coordinate converting unit 90 identifies a target position expressed by the shared Euclidean coordinate system and corresponding to the target position expressed by the geographic coordinate system and indicated by the target position data received in the processing in S302 (S304).

Then, the server display control unit 92 generates conversion target position data indicating the target position expressed by the shared Euclidean coordinate system and identified in the processing in S304 (S305).

Then, the server display control unit 92 transmits the conversion target data generated in the processing in S305 to the tracker 12, and the position data receiving unit 74 of the tracker 12 receives the conversion target data in question (S306).

Then, the image generating unit 76 generates a target image on the basis of the conversion target data received in the processing in S306 and the latest tracker position data (tracker position data received by the tracker 12 most recently) (S307).

Then, the tracker display control unit 78 controls the display unit 36 to display the target image generated in the processing in S307 (S308), and the processing in the present processing example ends.

In the present embodiment, in response to a tap operation for designating the geographic position P1 on a map displayed on the terminal 14 included in the user system 10, a target image may be displayed on the display unit 36 of the tracker 12 included in the user system 10 in question.

In this case, for example, in response to a tap operation for designating the geographic position P1 on a map displayed on the terminal 14 included in the user system 10, a target position expressed by the shared Euclidean coordinate system may be identified on the basis of the latest estimated position and orientation of the tracker 12 included in the user system 10 in question and target position data indicating a target position that is the geographic position P1 in question. Then, conversion target position data indicating the identified target position may be generated. Then, the conversion target position data in question may be transmitted to the tracker 12 included in the user system 10 in question. Then, a target image may be generated on the basis of tracker position data indicating the latest estimated position and orientation of the tracker 12 in question and the conversion target position data in question. Then, the generated target image may be displayed on the display unit 36 of the tracker 12 in question.

Further, in the present embodiment, the server display control unit 92 may perform control so that the display unit 36 included in each of the plurality of trackers 12 in a given range in real space displays a target image corresponding to a corresponding one of the trackers 12. For example, the server display control unit 92 may perform control in response to a tap operation for designating the geographic position P1 on a map displayed on the terminal 14 so that the display units 36 of the plurality of trackers 12 display target images. In this case, conversion target position data may be transmitted to the plurality of trackers 12.

For example, with regard to each of the plurality of trackers 12, a target position expressed by the shared Euclidean coordinate system may be identified on the basis of the latest position and the orientation of the tracker 12 in question and target position data indicating a target position that is the geographic position P1. Then, with regard to each of the plurality of trackers 12, conversion target position data indicating the target position identified on the basis of the latest position and orientation of the tracker 12 in question may be transmitted to the tracker 12 in question.

Here, for example, the server display control unit 92 may perform control so that the display unit 36 of the tracker 12 away from a target position by a predetermined distance or less displays a target image. Alternatively, the server display control unit 92 may perform control so that the display unit 36 of the tracker 12 whose latest position is mapped in the shared Euclidean coordinate system used by the environmental map data storing unit 80 determined on the basis of a target position displays a target image.

As described above, in the present embodiment, a target position expressed by the Euclidean coordinate system is identified on the basis of target position data indicating a target position expressed by the geographic coordinate system and environmental map data. In such a way, the position of the tracker 12 and a target position are both accurately mapped in the shared Euclidean coordinate system. In such a way, according to the present embodiment, a given geographic position can be accurately mapped on an environmental map.

Further, in the present embodiment, an image representative of a view in which visual information placed at a target position expressed by the Euclidean coordinate system is seen from the position of the tracker 12 expressed by the Euclidean coordinate system is displayed. In such a way, according to the present embodiment, visual information can be accurately displayed at a real-world position corresponding to a given geographic position.

Expected application examples of the present embodiment include various fields such as automatic operation, factory automation (FA), drone autopilot, and the remote control or indication of equipment.

Note that, the present invention is not limited to the embodiment described above.

For example, how the tracker 12, the terminal 14, and the server 16 share the roles is not limited to the one described above. For example, the server 16 may generate a target image.

Further, geo pose data may include elevation/depression angle data indicating the elevation/depression angle of the tracker 12 when sensing data associated with the geo pose data in question is generated.

Note that, in the present embodiment, sensing data on personal space such as user's home may be prevented from being uploaded onto the server 16.

Further, other users may be prohibited from accessing key frame data, public pose data, and geo pose data on personal space.

Further, the above concrete character strings and numerical values and the concrete character strings and numerical values in the drawings are illustrative, and the present invention is not limited to those character strings and numerical values.

The invention claimed is:

1. A mapping apparatus comprising:
a processor; and
a storage unit storing instructions which, when executed by the processor, cause the mapping apparatus to perform operations comprising:
storing environmental map data indicating environmental maps in which positions expressed by a Euclidean coordinate system are associated with positions expressed by a geographic coordinate system, wherein the environmental map data comprises a plurality of pieces wherein each piece of the plurality of pieces indicates environmental maps different from each other in position expressed by the geographic coordinate system and associated with an origin of the Euclidean coordinate system;
estimating, on a basis of sensing data acquired by a tracker and the environmental map data, a position of the tracker expressed by the Euclidean coordinate system, wherein the environmental map data is identified from the plurality of pieces of the environmental map data on the basis of the sensing data;
acquiring target position data indicating a target position expressed by the geographic coordinate system; and
identifying, on a basis of the target position data and the environmental map data, the target position expressed by the Euclidean coordinate system, wherein the environmental map data is identified from the plurality of pieces of the environmental map data on the basis of the target position data.

2. The mapping apparatus according to claim 1, wherein the instructions further cause the mapping apparatus to perform operations comprising:
performing control of a display in the tracker to display an image representative of a view in which visual information placed at the target position expressed by the Euclidean coordinate system is seen from the position of the tracker expressed by the Euclidean coordinate system.

3. The mapping apparatus according to claim 2, wherein the instructions further cause the mapping apparatus to perform operations comprising:
acquiring the target position data associated with registered data registered on a given map service in association with the target position, and
performing control of the display in the tracker to display an image representative of a view in which the visual information on a basis of the registered data is seen from the position of the tracker expressed by the Euclidean coordinate system.

4. The mapping apparatus according to claim 2, wherein the instructions further cause the mapping apparatus to perform operations comprising:

acquiring the target position data associated with name data indicating a name corresponding to the target position, and performing control of the display in the tracker to display an image representative of a view in which the visual information representing the name indicated by the name data is seen from the position of the tracker expressed by the Euclidean coordinate system.

5. The mapping apparatus according to claim 2, wherein the instructions further cause the mapping apparatus to perform operations comprising:

displaying in each of a plurality of the trackers in a given range in real space displays the image corresponding to a corresponding one of the trackers.

6. The mapping apparatus according to claim 2, wherein the instructions further cause the mapping apparatus to perform operations comprising:

transmitting, to the tracker, tracker position data indicating the position of the tracker expressed by the Euclidean coordinate system and conversion target position data indicating the target position expressed by the Euclidean coordinate system.

7. The mapping apparatus according to claim 1, wherein the instructions further cause the mapping apparatus to perform operations comprising:

acquiring, in response to a user operation for designating the target position on a map displayed on a terminal different from the tracker, the target position data indicating the target position designated.

8. The mapping apparatus according to claim 1, wherein the instructions further cause the mapping apparatus to perform operations comprising:

estimating, on a basis of the sensing data and the environmental map data, the position of the tracker expressed by the Euclidean coordinate system and the position of the tracker expressed by the geographic coordinate system, and identifying the target position expressed by the Euclidean coordinate system on a basis of the target position data, the position of the tracker expressed by the Euclidean coordinate system, and the position of the tracker expressed by the geographic coordinate system.

9. The mapping apparatus according to claim 1, wherein the instructions further cause the mapping apparatus to perform operations comprising:

estimating, on a basis of a set of feature points included in the environmental map and a map indicated by given map data provided by a given map service, a position and an orientation expressed by the geographic coordinate system and corresponding to the set of feature points; and associating the position and the orientation that have been estimated with the set of feature points.

10. The mapping apparatus according to claim 9, wherein the instructions further cause the mapping apparatus to perform operations comprising:

estimating the orientation expressed by the geographic coordinate system and corresponding to the set of feature points on a basis of a first projection image that is an image having a first resolution and being representative of a view in which the set of feature points is projected on a plane orthogonal to a gravity axis and a first reference image that is an image having the first resolution and generated on a basis of the map, and estimating the position expressed by the geographic coordinate system and corresponding to the set of feature points on a basis of a second projection image that is an image having a second resolution higher than the first resolution and being representative of a view in which the set of feature points is projected on the plane, a second reference image that is an image having the second resolution and generated on a basis of the map, and the orientation estimated.

11. A tracker comprising:

a sensor unit;

a display unit;

a processor; and a storage unit storing instructions which, when executed by the processor, cause the tracker to perform operations comprising:

displaying, on a basis of a position of the tracker expressed by a Euclidean coordinate system and a target position that is a geographic position designated by a user on a map displayed on a terminal different from the tracker, an image in the display unit, wherein the image is representative of a view in which visual information placed at the target position expressed by the Euclidean coordinate system is seen from the position of the tracker expressed by the Euclidean coordinate system, wherein:

map data indicates maps in which positions expressed by the Euclidean coordinate system are associated with positions expressed by a geographic coordinate system;

the map data comprises a plurality of pieces wherein each piece of the plurality of pieces indicates maps different from each other in position expressed by the geographic coordinate system and associated with an origin of the Euclidean coordinate system; and the position of the tracker is estimated on a basis of sensing data acquired by the sensor unit and map data identified from the plurality of pieces of the map data based on the sensing data.

12. A mapping method comprising:

storing environmental map data indicating environmental maps in which positions expressed by a coordinate system are associated with positions expressed by a geographic coordinate system, wherein the environmental map data comprises a plurality of pieces wherein each piece of the plurality of pieces indicates environmental maps different from each other in position expressed by the geographic coordinate system and associated with an origin of the coordinate system;

estimating, on a basis of sensing data acquired by a tracker and environmental map data a position of the tracker expressed by the coordinate system, wherein the environmental map data is identified from the plurality of pieces of the environmental map data on the basis of the sensing data;

acquiring target position data indicating a target position expressed by the geographic coordinate system; and identifying the target position expressed by the coordinate system on a basis of the target position data and the environmental map data, wherein the environmental map data is identified from the plurality of pieces of the environmental map data on the basis of the target position data.

13. A computer-readable information storage medium embodying instructions that, when executed by a processor, causes the processor to:

storing environmental map data indicating environmental maps in which positions expressed by a coordinate system are associated with positions expressed by a geographic coordinate system, wherein the environmental map data comprises a plurality of pieces wherein each piece of the plurality of pieces indicates environmental maps different from each other in position expressed by the geographic coordinate system and associated with an origin of the coordinate system;

estimating, on a basis of sensing data acquired by a tracker and environmental map data a position of the tracker expressed by the coordinate system, wherein the environmental map data is identified from the plurality of pieces of the environmental map data on the basis of the sensing data;

acquiring target position data indicating a target position expressed by the geographic coordinate system; and identifying the target position expressed by the coordinate system on a basis of the target position data and the environmental map data, wherein the environmental map data is identified from the plurality of pieces of the environmental map data on the basis of the target position data.

14. The mapping method of claim 12, wherein the coordinate system comprises a Euclidean coordinate system.

15. The computer-readable information storage medium of claim 13, wherein the coordinate system comprises a Euclidean coordinate system.

* * * * *